United States Patent
Seo et al.

(10) Patent No.: US 10,314,070 B2
(45) Date of Patent: Jun. 4, 2019

(54) METHOD OF TRANSMITTING/RECEIVING SIGNAL IN WIRELESS COMMUNICATION SYSTEM SUPPORTING MACHINE TYPE COMMUNICATION AND DEVICE THEREFOR

(71) Applicant: LG Electronics Inc., Seoul (KR)

(72) Inventors: Hanbyul Seo, Seoul (KR); Yunjung Yi, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/545,450

(22) PCT Filed: Jan. 25, 2016

(86) PCT No.: PCT/KR2016/000782
§ 371 (c)(1),
(2) Date: Jul. 21, 2017

(87) PCT Pub. No.: WO2016/117984
PCT Pub. Date: Jul. 28, 2016

(65) Prior Publication Data
US 2018/0007709 A1     Jan. 4, 2018

Related U.S. Application Data

(60) Provisional application No. 62/109,046, filed on Jan. 28, 2015, provisional application No. 62/106,738, filed on Jan. 23, 2015.

(51) Int. Cl.
    *H04W 72/12*        (2009.01)
    *H04L 1/00*         (2006.01)
    (Continued)

(52) U.S. Cl.
    CPC ........... *H04W 72/1278* (2013.01); *H04L 1/00* (2013.01); *H04L 1/18* (2013.01); *H04L 1/189* (2013.01);
    (Continued)

(58) Field of Classification Search
    CPC ...................................................... H04L 12/28
    (Continued)

(56) References Cited

U.S. PATENT DOCUMENTS 10,020,917 B2 *    7/2018    Lee ........................ H04L 1/1812

FOREIGN PATENT DOCUMENTS

WO     2014/112905 A1     7/2014

OTHER PUBLICATIONS

Ericsson: "Physical channel timing relationships for MTC", R1-144558, 3GPP TSG RAN WG1 Meeting #79, San Francisco, USA, Nov. 17-21, 2014.

(Continued)

*Primary Examiner* — Dang T Ton
(74) *Attorney, Agent, or Firm* — Dentons US LLP

(57) ABSTRACT

Provided are an eNodeB (eNB) and a user equipment (UE) in a wireless communication system supporting a machine type communication (MTC). The present invention comprises: receiving a first message including a UE-specific configuration on the basis of a common configuration for a plurality of UEs; and receiving a second message according to the UE-specific configuration, wherein the common configuration may include at least one of the number of times of repetition of the first message and a rate matching pattern of the first message.

10 Claims, 13 Drawing Sheets

(51) Int. Cl.
  *H04L 1/18*    (2006.01)
  *H04W 4/70*    (2018.01)
  *H04L 5/00*    (2006.01)
  *H04W 72/04*   (2009.01)
  *H04W 48/10*   (2009.01)
(52) U.S. Cl.
  CPC ............ *H04L 1/1822* (2013.01); *H04L 5/001* (2013.01); *H04L 5/0051* (2013.01); *H04L 5/0053* (2013.01); *H04W 4/70* (2018.02); *H04W 72/0406* (2013.01); *H04L 1/1864* (2013.01); *H04L 5/0055* (2013.01); *H04W 48/10* (2013.01)
(58) Field of Classification Search
  USPC ........................................................ 370/329
  See application file for complete search history.

(56) References Cited

OTHER PUBLICATIONS

LG Electronics: "Common control message transmission for MTC", R1-144895, 3GPP TSG RAN WG1 Meeting #79, San Francisco, USA, Nov. 17-21, 2014.
Catt: "PRACH coverage enhancement", R1-144623, 3GPP TSG RAN WG1 Meeting #79, San Francisco, USA, Nov. 17-21, 2014.
Huawei: "Measurements and reporting for configuring coverage enhancements", R1-144329, 3GPP TSG RAN WG1 Meeting #78b, Ljubljana, Slovenia, Oct. 6-10, 2014.

* cited by examiner

FIG. 5
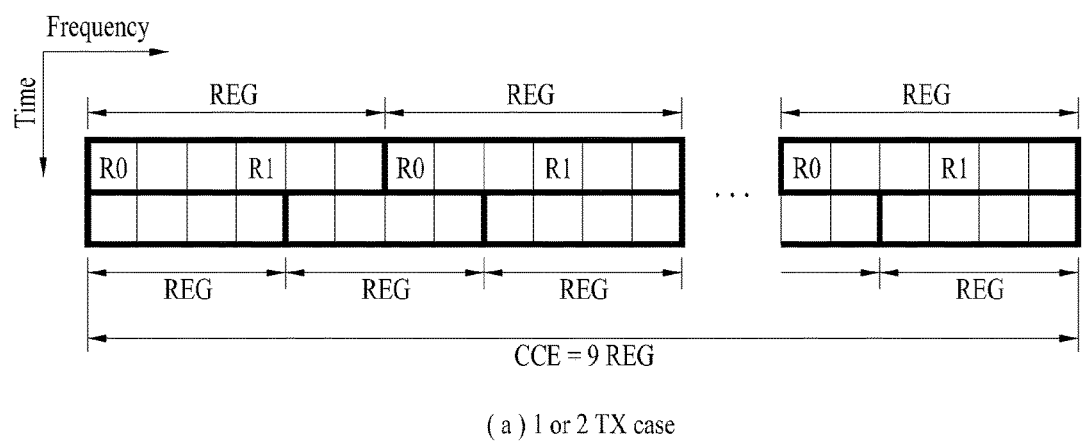
(a) 1 or 2 TX case
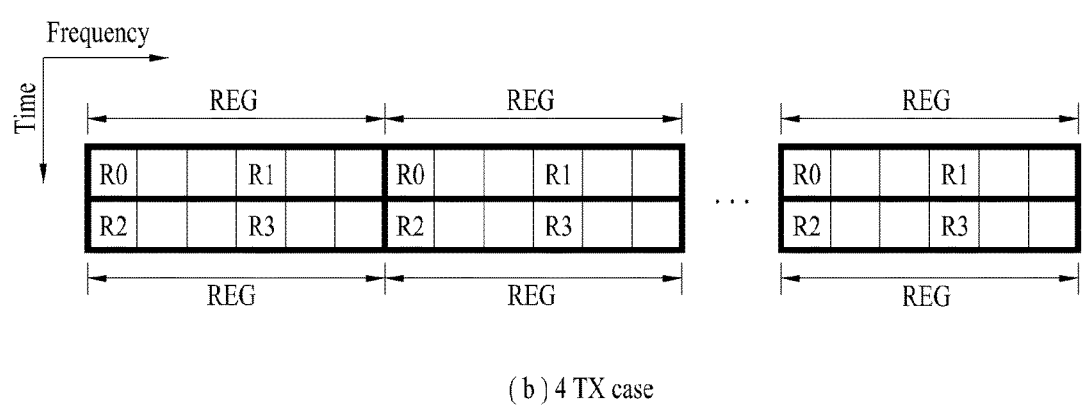
(b) 4 TX case

FIG. 13

| \- | \- | \- | One repetition period | \- | \- | \- | \- |
|---|---|---|---|---|---|---|---|
| (E)CCE #24 | (E)CCE #28 | (E)CCE #25 | (E)CCE #29 | (E)CCE #26 | (E)CCE #30 | (E)CCE #27 | (E)CCE #31 |
| (E)CCE #16 | (E)CCE #20 | (E)CCE #17 | (E)CCE #21 | (E)CCE #18 | (E)CCE #22 | (E)CCE #19 | (E)CCE #23 |
| (E)CCE #8 | (E)CCE #12 | (E)CCE #9 | (E)CCE #13 | (E)CCE #10 | (E)CCE #14 | (E)CCE #11 | (E)CCE #15 |
| (E)CCE #0 | (E)CCE #4 | (E)CCE #1 | (E)CCE #5 | (E)CCE #2 | (E)CCE #6 | (E)CCE #3 | (E)CCE #7 |
| SF #0 | SF #1 | SF #2 | SF #3 | SF #4 | SF #5 | SF #6 | SF #7 |

FIG. 14

| \- | \- | \- | One repetition period | \- | \- | \- | \- |
|---|---|---|---|---|---|---|---|
| (E)CCE #24 | (E)CCE #28 | (E)CCE #26 | (E)CCE #30 | (E)CCE #25 | (E)CCE #29 | (E)CCE #27 | (E)CCE #31 |
| (E)CCE #16 | (E)CCE #20 | (E)CCE #18 | (E)CCE #22 | (E)CCE #17 | (E)CCE #21 | (E)CCE #19 | (E)CCE #23 |
| (E)CCE #8 | (E)CCE #12 | (E)CCE #10 | (E)CCE #14 | (E)CCE #9 | (E)CCE #13 | (E)CCE #11 | (E)CCE #15 |
| (E)CCE #0 | (E)CCE #4 | (E)CCE #2 | (E)CCE #6 | (E)CCE #1 | (E)CCE #5 | (E)CCE #3 | (E)CCE #7 |
| SF #0 | SF #1 | SF #2 | SF #3 | SF #4 | SF #5 | SF #6 | SF #7 |

METHOD OF TRANSMITTING/RECEIVING SIGNAL IN WIRELESS COMMUNICATION SYSTEM SUPPORTING MACHINE TYPE COMMUNICATION AND DEVICE THEREFOR

This application is a 35 USC § 371 National Stage entry of International Application No. PCT/KR2016/000782 filed on Jan. 25, 2016, and claims priority to U.S. Provisional Application Nos. 62/106,738 filed on Jan. 23, 2015 and 62/109,046 filed on Jan. 28, 2015, all of which are hereby incorporated by reference in their entireties as if fully set forth herein.

TECHNICAL FIELD

The present invention relates to a wireless communication system, and more particularly, to a method of transmitting and receiving a signal in machine type communication (MTC) and an apparatus therefor.

BACKGROUND ART

Wireless communication systems have been widely deployed to provide various types of communication services such as voice or data. In general, a wireless communication system is a multiple access system that supports communication with multiple users by sharing available system resources (bandwidth, transmission power, etc.). For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. WiMAX may be described based on the IEEE an 802.16e standard (WirelessMAN-OFDMA reference system) and the evolved IEEE 802.16m standard (WirelessMAN-OFDMA advanced system).

Recently, in a communication technology standardization institute (e.g. 3GPP, IEEE, etc.) that establishes a next-generation communication technology standard (e.g. beyond LTE-A), a machine type communication (MTC) has emerged as one important standardization issue. MTC refers to information exchange between a machine and a base station, performed without human intervention.

DISCLOSURE OF THE INVENTION

Technical Task

Since a communication service provided by MTC is different from a legacy communication service involved by human, it is necessary to define a new communication method appropriate for the MTC.

The technical objects that can be achieved through the present invention are not limited to what has been particularly described hereinabove and other technical objects not described herein will be more clearly understood by persons skilled in the art from the following detailed description.

Technical Solution

In order to solve the aforementioned technical task, a method for a UE to transmit and receive a signal, a method for an eNB to transmit and receive a signal in a wireless communication system supporting a machine type communication (MTC) device and an apparatus therefor are provided.

To achieve these and other advantages and in accordance with the purpose of the present invention, as embodied and broadly described, according to one embodiment, a method of receiving a signal, which is received by a user equipment (UE) based on a UE-specific configuration in a low-cost machine type wireless communication system, includes the steps of receiving a first message including the UE-specific configuration based on a common configuration for a plurality of UEs, and receiving a second message according to the UE-specific configuration. In this case, the common configuration can include at least one of the number of repetition of the first message and a rate matching pattern of the first message.

To further achieve these and other advantages and in accordance with the purpose of the present invention, according to a different embodiment, a method of transmitting a signal, which is transmitted by an eNB based on a UE-specific configuration in a low-cost machine type wireless communication system, includes the steps of transmitting a first message including the UE-specific configuration based on a common configuration for a plurality of UEs, and transmitting a second message according to the UE-specific configuration. In this case, the common configuration can include at least one of the number of repetition of the first message and a rate matching pattern of the first message.

To further achieve these and other advantages and in accordance with the purpose of the present invention, according to a further different embodiment, a user equipment (UE) in a wireless communication system supporting a machine type communication includes a transceiver configured to transmit and receive a signal and a processor, the processor configured to control the transceiver to receive a first message including the UE-specific configuration based on a common configuration for a plurality of UEs and receive a second message according to the UE-specific configuration. In this case, the common configuration can include at least one of the number of repetition of the first message and a rate matching pattern of the first message.

To further achieve these and other advantages and in accordance with the purpose of the present invention, according to a further different embodiment, an eNB in a wireless communication system supporting a machine type communication includes a transceiver configured to transmit and receive a signal and a processor, the processor configured to control the transceiver to transmit a first message including the UE-specific configuration based on a common configuration for a plurality of UEs and transmit a second message according to the UE-specific configuration.

Following items can be commonly applied to each of the embodiments of the present invention.

The common configuration can be designated via a broadcasting channel transmitted from the eNB.

The common configuration can be set to the UE in advance.

The first message can include at least one selected from the group consisting of system configuration information (SIB) for the low-cost machine type, a random access response message or a contention resolution message, a message transmitted on a physical downlink shared channel, a message transmitted on a physical downlink control channel, and a message transmitted on an enhanced physical downlink control channel.

Meanwhile, the SIB for the low-cost machine type can be transmitted in time domain in which a physical downlink shared channel of a subframe is transmitted.

If the first message corresponds to the random access response message, the second message may correspond to the contention resolution message.

If the first message corresponds to the random access response message, the second message may correspond to at least one selected from the group consisting of the message transmitted on the physical downlink shared channel, the message transmitted on the physical downlink control channel, and the message transmitted on the enhanced physical downlink control channel.

If the first message corresponds to the contention resolution message, the method can further include the step of transmitting channel state measurement information to the eNB via a physical uplink shared channel (PUSCH). In this case, the UE-specific configuration can be determined based on the channel state measurement information.

If a change occurs on the UE-specific configuration, the method can further include the steps of transmitting a random access preamble to the eNB, and receiving a third message including a new UE-specific configuration. In this case, the third message can include at least one selected from the group consisting of the random access response message, the contention resolution message, the message transmitted on the physical downlink shared channel, the message transmitted on the physical downlink control channel, and the message transmitted on the enhanced physical downlink control channel.

The method can further include the steps of receiving uplink scheduling information from an eNB via a control channel, and transmitting a fourth message to the eNB based on the uplink scheduling information. In this case, if the uplink scheduling information is performed based on the common configuration, the fourth message can be transmitted using the common configuration. If the uplink scheduling information is performed based on the UE-specific configuration, the fourth message ca be transmitted using the UE-specific configuration.

The method can further include the steps of receiving uplink scheduling information from the eNB via a control channel, and transmitting a fourth message to the eNB based on the uplink scheduling information. In this case, the fourth message can be determined based on an attribute of the control channel.

It is to be understood that both the foregoing general description and the following detailed description are exemplary and explanatory and are intended to provide further explanation of the invention as claimed.

Advantageous Effects

According to one embodiment of the present invention, it is able to efficiently transmit/receive a wireless communication signal.

According to one embodiment of the present invention, low-price/low-cost user equipment can communication with an eNB while maintaining compatibility with a legacy system.

According to one embodiment of the present invention, it is able to implement a user equipment by low-price/low-cost.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 5 illustrates a resource unit used to configure a DL control channel;

FIG. 13 is a diagram for an example of repeatedly transmitting control information in a plurality of subframes according to one embodiment of the present invention;

FIG. 14 is a diagram for a different example of repeatedly transmitting control information according to one embodiment of the present invention;

BEST MODE

Mode for Invention

Figure 1:
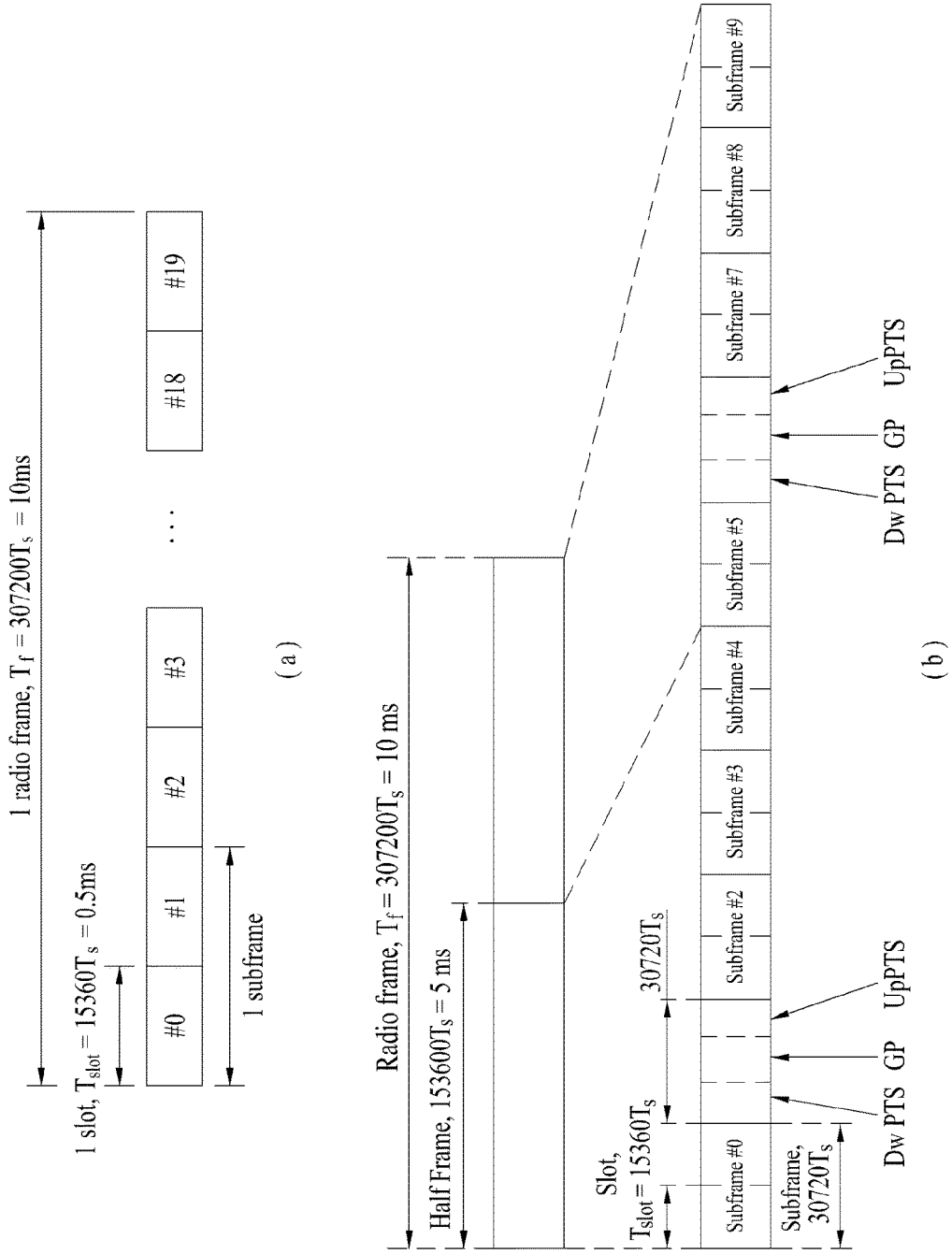
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | | Normal cyclic prefix in downlink | | Extended cyclic prefix in downlink | | |
|---|---|---|---|---|---|---|
| | | | UpPTS | | | UpPTS |
| Special subframe configuration | DwPTS | Normal cyclic prefix in uplink | Extended cyclic prefix in uplink | DwPTS ee | Normal cyclic prefix in uplink | Extended cyclic prefix in uplink |
| 0 | 6592 · Ts | 2192 · Ts | 2560 · Ts | 7680 · Ts | 2192 · Ts | 2560 · Ts |
| 1 | 19760 · Ts | | | 20480 · Ts | | |
| 2 | 21952 · Ts | | | 23040 · Ts | | |
| 3 | 24144 · Ts | | | 25600 · Ts | | |
| 4 | 26336 · Ts | | | 7680 · Ts | 4384 · Ts | 5120 · Ts |
| 5 | 6592 · Ts | 4384 · Ts | 5120 · Ts | 20480 · Ts | | |
| 6 | 19760 · Ts | | | 23040 · Ts | | |
| 7 | 21952 · Ts | | | — | — | — |
| 8 | 24144 · Ts | | | — | — | — |

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

Figure 2:
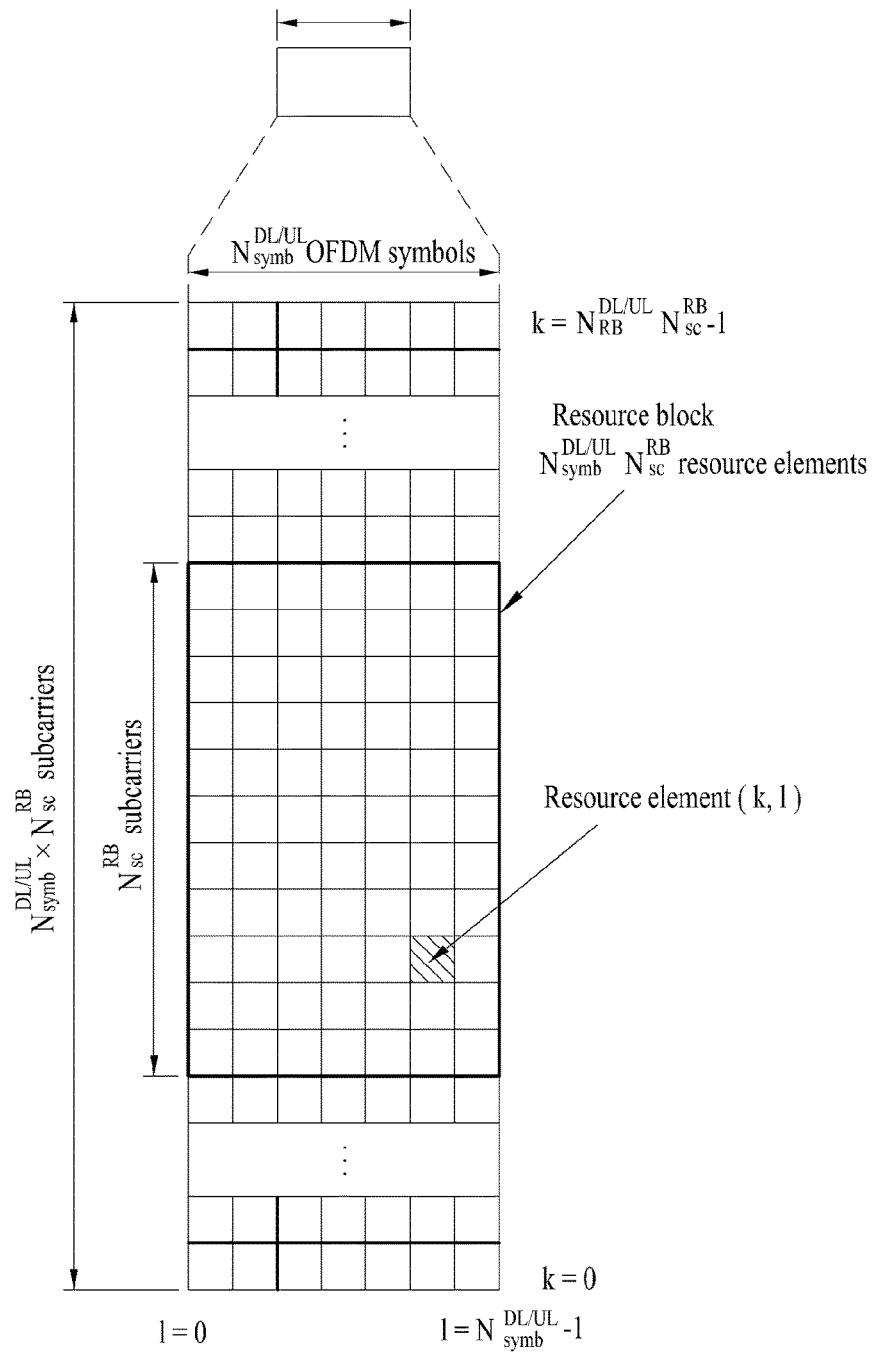
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} 1 - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
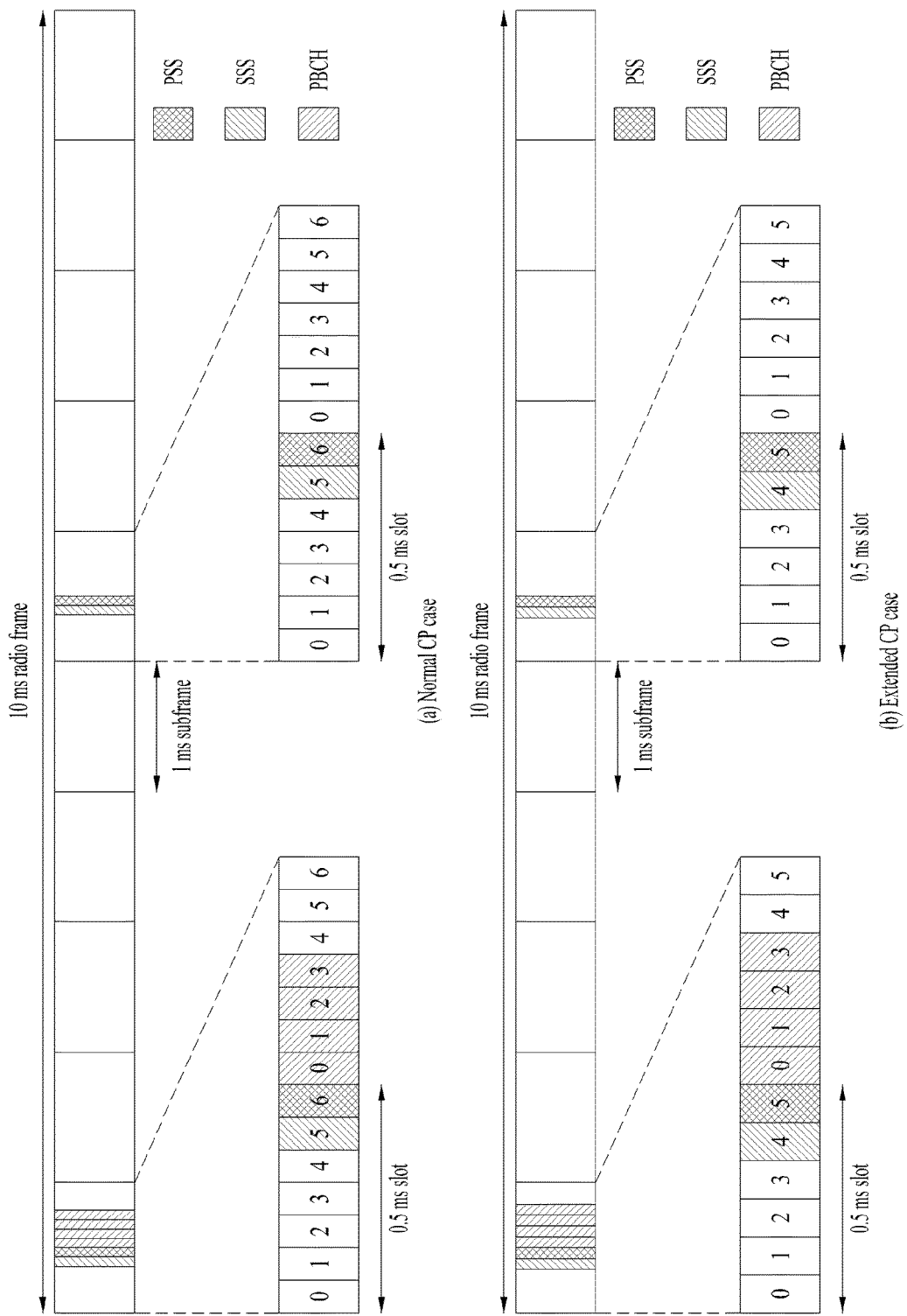
FIG. 3 illustrates a radio frame structure for transmission of a synchronization signal (SS)

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIB s.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, a UE which has accessed a network of an eNB may acquire more detailed system information by receiving a PDCCH and a PDSCH according to information carried on the PDCCH. After performing the aforementioned procedure, the UE may perform PDDCH/PDSCH reception and PUSCH/PUCCH transmission as general uplink/downlink transmission procedures.

Figure 4:
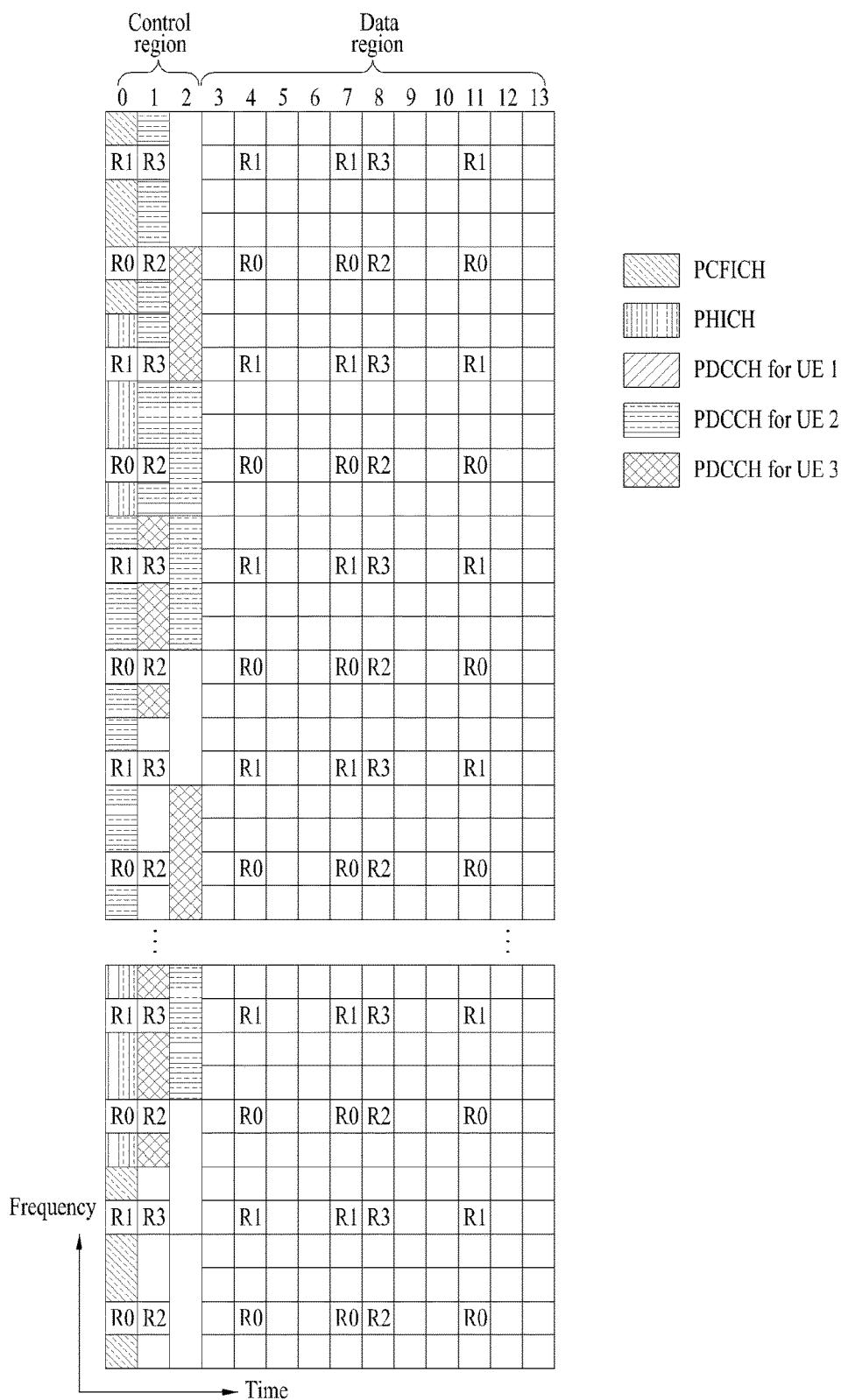
FIG. 4 illustrates the structure of a DL subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs. One REG includes 4 REs. The structure of the REG will be described in more detail with reference to FIG. 5.

A set of OFDM symbols available for the PDCCH at a subframe is given by the following table.

TABLE 3

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDSCH, configured with 1 or 2 cell-specfic antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

The PCFICH carries a control format indicator (CFI), which indicates any one of values of 1 to 3. For a downlink system bandwidth $N^{DL}_{RB} > 10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1. The CFI is coded in accordance with the following Table.

TABLE 4

| CFI | CFI code word $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

For PUSCH transmissions in subframe n, a UE shall determine the corresponding PHICH resource in subframe $n+k_{PHICH}$, where $k_{PHICH}$ is always 4 for FDD and is determined according to the following table for TDD.

TABLE 5

| TDD UL/DL configu- ration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A plurality of PHICHs mapped to a set of the same REs forms a PHICH group and PHICHs in the same PHICH group are distinguished from each other through different orthogonal sequences. The PHICH resource is identified by the index pair $(n^{group}_{PHICH}, n^{seq}_{PHICH})$. $n^{group}_{PHICH}$ the PHICH group number and $n^{seq}_{PHICH}$ is the orthogonal sequence index within the group. $n^{group}_{PHICH}$ and $n^{seq}_{PHICH}$ can be determined according to the following equation, for example.

$$n^{group}_{PHICH} = (I_{PRB\_RA} + n_{DMRS}) \bmod N^{group}_{PHICH} + I_{PHICH} N^{group}_{PHICH}$$

$$n^{seq}_{PHICH} = (\lfloor I_{PRB\_RA} / N^{group}_{PHICH} \rfloor + n_{DMRS}) \bmod 2N^{PHICH}_{SF} \quad \text{[Equation 1]}$$

Herein, $n_{DMRS}$ is a value indicating a cyclic shift applied to a DMRS for a corresponding PUSCH. $n_{DMRS}$ is obtained from a value set to the cyclic shift for DMRS field in the most recent DCI format 0. The DCI format 0 is used for scheduling of PUSCH. PDCCH with uplink DCI format [4] for the transport block(s) associated with the corresponding PUSCH transmission. $n_{DMRS}$ may be mapped based on a value set in the field in DCI format 0, for example, according to the following table.

TABLE 6

| Cyclic Shift for DMRS Field in DCI format 0 | nDMRS |
|---|---|
| 000 | 0 |
| 001 | 1 |
| 010 | 2 |
| 111 | 3 |
| 100 | 4 |
| 101 | 5 |
| 110 | 6 |
| 111 | 7 |

If a PDCCH having a UL DCI format for the same transport block is not present and an initial PUSCH for the same transport block is scheduled semi-persistently or by a random access response grant, $n_{DMRS}$ is set to 0.

$N^{PHICH}_{SF}$ is the spreading factor size used for PHICH modulation.

$I_{PRB\_RA} = I^{lowest\_index}_{PRB\_RA}$ for the first transport block (TB) of a PUSCH with associated PDCCH or for the case of no associated PDCCH when the number of negatively acknowledged TBs is not equal to the number of TBs indicated in the most recent PDCCH associated with the corresponding PUSCH, and $I_{PRB\_RA} = I^{lowest\_index}_{PRB\_RA} + 1$ for a second TB of a PUSCH with associated PDCCH, where $I^{lowest\_index}_{PRB\_RA}$ is the lowest PRB index in the first slot of the corresponding PUSCH transmission. $I_{PHICH}$ is a value set to 1 or 0. $I_{PHICH} = 1$ for TDD UL/DL configuration 0 with PUSCH transmission in subframe n=4 or 9, and $I_{PHICH} = 0$ otherwise. $N^{group}_{PHICH}$ represents the number of PHICH groups configured by a higher layer. The number of PHICH groups, $N^{group}_{PHICH}$, may be determined as follows.

$$N^{group}_{PHICH} = \begin{cases} \lceil N_g (N^{DL}_{RB}/8) \rceil & \text{for normal cyclic prefix} \\ 2 \cdot \lceil N_g (N^{DL}_{RB}/8) \rceil & \text{for extended cyclic prefix} \end{cases} \quad \text{[Equation 2]}$$

Herein, $N_g$ is a value that is selected from among four values of $\{1/6, 1/2, 1, 2\}$ and signaled by a higher layer. For example, when a system band is 25 RBs and a normal CP is used, $N^{group}_{PHICH}$ is $\{1, 2, 4, 7\}$ with respect to $N_g$ of $\{1/6, 1/2, 1, 2\}$. The PHICH group index $n^{group}_{PHICH}$ has a range from 0 to $N^{group}_{PHICH} - 1$.

In frame structure type 2, the number of PHICH groups varies between subframes and is given as $m_i \cdot N^{group}_{PHICH}$. $N^{group}_{PHICH}$ is given by Equation 2 and $m_i$ is given by the following table with a UL-DL configuration provided by a higher-layer parameter called subframe assignment (subframeAssignment).

TABLE 7

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | 0 | 0 | 0 | 2 | 1 | 0 | 0 | 0 |
| 1 | 0 | 1 | 0 | 0 | 1 | 0 | 1 | 0 | 0 | 1 |
| 2 | 0 | 0 | 0 | 1 | 0 | 0 | 0 | 0 | 1 | 0 |
| 3 | 1 | 0 | 0 | 0 | 0 | 0 | 0 | 0 | 1 | 1 |
| 4 | 0 | 0 | 0 | 0 | 0 | 0 | 0 | 0 | 1 | 1 |
| 5 | 0 | 0 | 0 | 0 | 0 | 0 | 0 | 0 | 1 | 0 |
| 6 | 1 | 1 | 0 | 0 | 0 | 1 | 1 | 0 | 0 | 1 |

In a subframe with non-zero PHICH resources, the PHICH group index $n^{group}_{PHICH}$ has a range from 0 to $m_i \cdot N^{group}_{PHICH} - 1$.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

A PDCCH is allocated to the first m OFDM symbol(s) in a subframe wherein m is an integer equal to or greater than 1 and is indicated by a PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A DCI format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

The following table illustrates PDCCH formats.

TABLE 8

| PDCCH format | Number of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transmission block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

If RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH). The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that (those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107,108,109,110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

Referring back to FIG. 4, R0 to R3 denote CRSs for antenna ports 0 to 3. According to the number of antenna ports of a transmission node, CRS(s) of R0, R0 and R1, or R0 to R3 are transmitted. A CRS is fixed to a predetermined pattern in a subframe regardless of a control region and a data region. A control channel is allocated to a resource to which the CRS is not allocated in a control region and a data channel is allocated to a resource to which the CRS is not allocated in a data region.

In a legacy 3GPP LTE system, since the CRS is used for both demodulation and measurement, the CRS is transmitted throughout an entire DL bandwidth in all DL subframes in a cell supporting PDSCH transmission and is transmitted through all antenna ports configured for an eNB.

Specifically, a CRS sequence $r_{l,n_s}(n)$ is defined according to the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 3]

$$m = 0, 1, \ldots, 2N_{RB}^{max,DL} - 1$$

Herein, $n_s$ is a slot number in a radio frame and l is an OFDM symbol number in a slot. In this case, $N^{max,DL}_{RB}$ denotes the largest DL bandwidth configuration and is represented as an integer multiple of $N^{RB}_{sc}$. The pseudo-random sequence c(i) is defined by a length-31 Gold sequence. The output sequence c(n) of length $M_{PN}$, where n=0, 1, . . . , $M_{PN}$−1, is defined by the following equation.

$c(n)=(x_1(n+N_C)+x_2(n+N_C)) \bmod 2$ $x_1(n+31)=(x_1(n+3)+x_1(n)) \bmod 2$ $x_2(n+31)=(x_2(n+3)+x_2(n+2)+x_2(n+1)+x_2(n)) \bmod 2$ [Equation 4]

where $N_C$=1600 and the first m-sequence is initialized with $x_1(0)$=1, $x_1(n)$=0, n=1, 2, . . . , 30. The initialization of the second m-sequence is denoted by the following equation with the value depending on the application of the sequence.

$c_{init} = \sum_{i=0}^{30} x_2(i) \cdot 2^i$ [Equation 5]

In Equation 3, the pseudo-random sequence generator for generating c(i) is initialized with $c_{init}$ at the start of each subframe according to the following equation.

$c_{init}=2^{10} \cdot (7 \cdot (n_s+1)+l+1) \cdot (2 \cdot N_{ID}^{cell}+1)+2 \cdot N_{ID}^{cell}+N_{CP}$ [Equation 6]

Herein, $N^{cell}_{ID}$ denotes a physical cell ID (or a physical layer cell ID) that a UE can obtain based on a PSS/SSS and $N_{CP}$ is a value defined as 1 for a normal CP and as 0 for an extended CP.

A CRS sequence $r_{l,n_s}(m)$ is mapped, according to the following equation, to complex-valued modulation symbols $a^{(p)}_{k,l}$ used as reference symbols for an antenna port p in a slot $n_s$.

$a_{k,l}^{(p)} = r_{l,n_s}(m')$ [Equation 7]

Herein, $n_s$ is a slot number in a radio frame and l is an OFDM symbol number in a slot and is determined according to the following equation.

$$k = 6m + (v + v_{shift}) \bmod 6$$ [Equation 8]

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

Herein, $N^{max,DL}_{RB}$ is the largest DL bandwidth configuration and is expressed as an integer multiple of $N^{RB}_{sc}$. $N^{DL}_{RB}$ is a DL bandwidth configuration and is represented as an integer multiple of $N^{RB}_{sc}$. A UE is aware of the DL system bandwidth $N^{DL}_{RB}$ from an MIB carried by a PBCH.

In Equation 8, DL parameters v and $v_{shift}$ define locations in a frequency for other RSs and v is given by the following equation.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$ [Equation 9]

A cell-specific frequency shift $v_{shift}$ is given by the following equation according to a physical layer cell $N^{cell}_{ID}$.

$v_{shift} = N_{ID}^{cell} \bmod 6$ [Equation 10]

REs (k,l) used for transmission of CRSs over any one of antenna ports in a slot are not used for transmission of CRSs over any other antenna ports in the same slot and are set to 0. That is, powers of REs used for transmission of CRSs of other antenna ports in the same slot are set to 0 in corresponding antenna ports.

A UE may measure CSI using a CRS and demodulate, using the CRS, signals received through a PDCCH and/or a PDSCH in a subframe with the CRS. That is, an eNB transmits a CRS at a predetermined location in each RB in all RBs and the UE detects the PDCCH and/or the PDSCH after performing channel estimation based on the CRS. For example, the UE may measure a signal received on a CRS RE and detect a PDCCH/PDSCH signal from an RE to which the PDCCH/PDSCH is mapped using the measured signal and using a ratio of reception energy of each RE to which the PDCCH/PDSCH is mapped to reception energy of each CRS RE.

In the following, downlink power allocation in LTE/LTE-A system is explained in detail.

An eNB can determine downlink transmit power per RE. A UE assumes that a specific CRS EPRE (energy per resource element) is consistent in a downlink system bandwidth and all subframes until specific reference signal power information of a different cell is received. The CRS EPRE can be induced from downlink reference signal transmit power given by a parameter referenceSignalPower provided by higher layer. The downlink reference signal transmit power can be defined by a linear average of power of all REs transmitting a CRS in a system bandwidth.

Subsequently, power of an RE transmitting PDSCH can be determined based on the CRS EPRE. Error! Objects cannot be created from editing field codes. and Error! Objects cannot be created from editing field codes. corresponding to the ratio of PDSCH EPRE to CRS EPRE are defined for each OFDM symbol. The Error! Objects cannot be created from editing field codes. corresponds to the ratio of PDSCH EPRE to CRS EPRE in an OFDM symbol where a CRS does not exist. The Error! Objects cannot be created from editing field codes. corresponds to the ratio of PDSCH EPRE to CRS EPRE in an OFDM symbol where a CRS exists.

A UE is able to know the Error! Objects cannot be created from editing field codes. and the Error! Objects cannot be created from editing field codes. based on $P_A$ and $P_B$ corresponding to parameters related to transmit power, which is received via higher layer signaling. More specifically, there is a relation corresponding to equation 11 in the following between the Error! Objects cannot be created from editing field codes. and the $P_A$. Hence, a UE is able to calculate the Error! Objects cannot be created from editing field codes. based on the signaled $P_A$.

Error! Objects cannot be created from editing field codes.=$P_A$ [dB]

Error! Objects cannot be created from editing field codes.=☐ power-offset+$P_A$ [dB]

Error! Objects cannot be created from editing field codes.=☐ power-offset+$P_A$+10 log 10(2)[dB]  [Equation 11]

In this case, power-offset corresponds to 0 in all PDSCH transmission schemes except multi-user MIMO. The $P_A$ is forwarded to a UE as a UE-specific parameter via higher layer signaling. A value of the $P_A$ may correspond to one of values shown in Table 9 in the following.

TABLE 9

| | Value |
|---|---|
| $P_A$ | 3 dB, 2 dB, 1 dB, 0 dB, −1.77 dB, −3 dB, −4.77 dB, −6 dB |

Meanwhile, there are relations shown in table 10 among Error! Objects cannot be created from editing field codes., Error! Objects cannot be created from editing field codes, and $P_B$. In this case, the $P_B$ corresponds to a cell-specific parameter and is forwarded to a UE via higher layer signaling.

TABLE 10

| | Error! Objects cannot be created from editing field codes./Error! Objects cannot be created from editing field codes. | |
|---|---|---|
| $P_B$ | Single antenna port | Two and Four antenna ports |
| 0 | 1 | 5/4 |
| 1 | 4/5 | 1 |
| 2 | 3/5 | 3/4 |
| 3 | 2/5 | 1/2 |

A UE is able to know $\rho_B$ via the $\rho_A$ calculated by the equation 2 and the $P_B$ on the basis of Table 10.

FIG. 5 illustrates a resource unit used to configure a DL control channel.

FIG. 5(a) illustrates a resource unit when the number of transmission antenna ports is 1 or 2 and FIG. 5(b) illustrates a resource unit when the number of transmission antenna ports is 4. Only CRS patterns are different according to the number of transmission antennas and methods of configuring a resource unit related to a control channel are identical. Referring to FIG. 5, a resource unit for a control channel is an REG. The REG includes 4 neighboring REs excluding a CRS. That is, the REG includes REs except for REs indicated by any one of R0 to R3 in FIG. 5. A PFICH and a PHICH include 4 REGs and 3 REGs. A PDCCH is configured in units of CCEs each including 9 REGs. While REGs constituting a CCE are adjacent to each other in FIG. 5, 9 REGs constituting the CCE may be distributed on a frequency and/or time axis in a control region.

A processing procedure of a PDCCH will now be described in more detail as follows.

The block of bits $b^{(i)}(0), \ldots, b^{(i)}(M^{(i)}_{bit}-1)$ on each of the control channels to be transmitted in a subframe, where $M^{(i)}_{bit}$ is the number of bits in one subframe to be transmitted on physical downlink control channel number i, is multiplexed, resulting in a block of bits $b^{(0)}(0), \ldots, b^{(0)}(M^{(0)}_{bit}-1), b^{(1)}(0), \ldots, b^{(1)}(M^{(1)}_{bit}-1), \ldots, b^{(nPDCCH-1)}(0), \ldots, b^{(nPDCCH-1)}(M^{(nPDCCH-1)}_{bit}-1)$, where nPDCCH is the number of PDCCHs transmitted in the subframe. The block of bits $b^{(1)}(0), \ldots, b^{(1)}(M^{(1)}_{bit}-1), \ldots, b^{(nPDCCH-1)}(0), \ldots, b^{(nPDCCH-1)}(M^{(nPDCCH-1)}_{bit}-1)$ ≙ shall be scrambled with a cell-specific sequence prior to modulation, resulting in a block of scrambled bits Error! Objects cannot be created from editing field codes.according to the following equation.

$$\tilde{b}(i)=(b(i)+c(i))\bmod 2 \quad [\text{Equation 12}]$$

where the scrambling sequence c(i) is given by Equation 4. The scrambling sequence generator is initialised by the following equation at the start of each subframe.

$$c_{init}=\lfloor n_s/2 \rfloor 2^9+N_{ID}^{cell} \quad [\text{Equation 13}]$$

CCE number n corresponds to bits b(72n), b(72n+1), . . . , b(72n+71).

The block of scrambled bitsError! Objects cannot be created from editing field codes. is modulated by QPSK, resulting in a block of complex-valued modulation symbols $d(0), \ldots, d(M_{sym}-1)$.

The block of modulation symbols $d(0), \ldots, d(M_{symb}-1)$ is mapped to layers according to one of layer mapping for transmission on a single antenna port or layer mapping for transmit diversity and precoded according to one of precoding for transmission on a single antenna port or precoding for transmit diversity, resulting in a block of vectors $y(i)=[y^{(0)}(i) \ldots y^{(P-1)}(i)]$ (where $i=0, \ldots, M_{symb}-1$) to be mapped onto resources on the antenna ports used for transmission, where $y^{(p)}(i)$ represents the signal for antenna port p.

The mapping to REs is defined by operations on quadruplets of complex-valued symbols. Let $z^{(p)}(i)=<y^{(p)}(4i), y^{(p)}(4i+1), y^{(p)}(4i+2), y^{(p)}(4i+3)>$ denote symbol quadruplet i for antenna port p. The block of quadruplets $z^{(p)}(0), \ldots, z^{(p)}(M_{quad}-1)$ (where $M_{quad}=M_{symb}/4$) is permuted resulting in $w^{(p)}(0), \ldots, w^{(p)}(M_{quad}-1)$.

The block of quadruplets $w^{(p)}(0), \ldots, w^{(p)}(M_{quad}-1)$ is cyclically shifted, resulting in Error! Objects cannot be created from editing field codes. whereError! Objects cannot be created from editing field codes.

Mapping of the block of quadruplets Error! Objects cannot be created from editing field codes. is defined in terms of resource-element groups according to steps 1-10 below.

Step 1) Initialize m'=0 (REG number).
Step 2) Initialize k'=0.
Step 3) Initialize l'=0.
Step 4) If the resource element (k', l') represents a REG and the REG is not assigned to PCFICH or PHICH, then perform step 5 and step 6, else go to step 7.
Step 5) Map symbol-quadruplet Error! Objects cannot be created from editing field codes. to the REG represented by (k', l') for each antenna port p.
Step 6) Increase m' by 1.
Step 7) Increase l' by 1.
Step 8) Repeat from step 4 if l'<L, where L corresponds to the number of OFDM symbols used for PDCCH transmission as indicated by the sequence transmitted on the PCFICH.
Step 9) Increase k' by 1.
Step 10) Repeat from step 3 if $k'<N^{DL}_{RB} \cdot N^{RB}_{sc}$.

Additionally, for more details of layer mapping, precoding, or permutation of the PDCCH, refer to documents of 3GPP LTE TS 36.211 and 3GPP LTE TS 36.212

Figure 6:
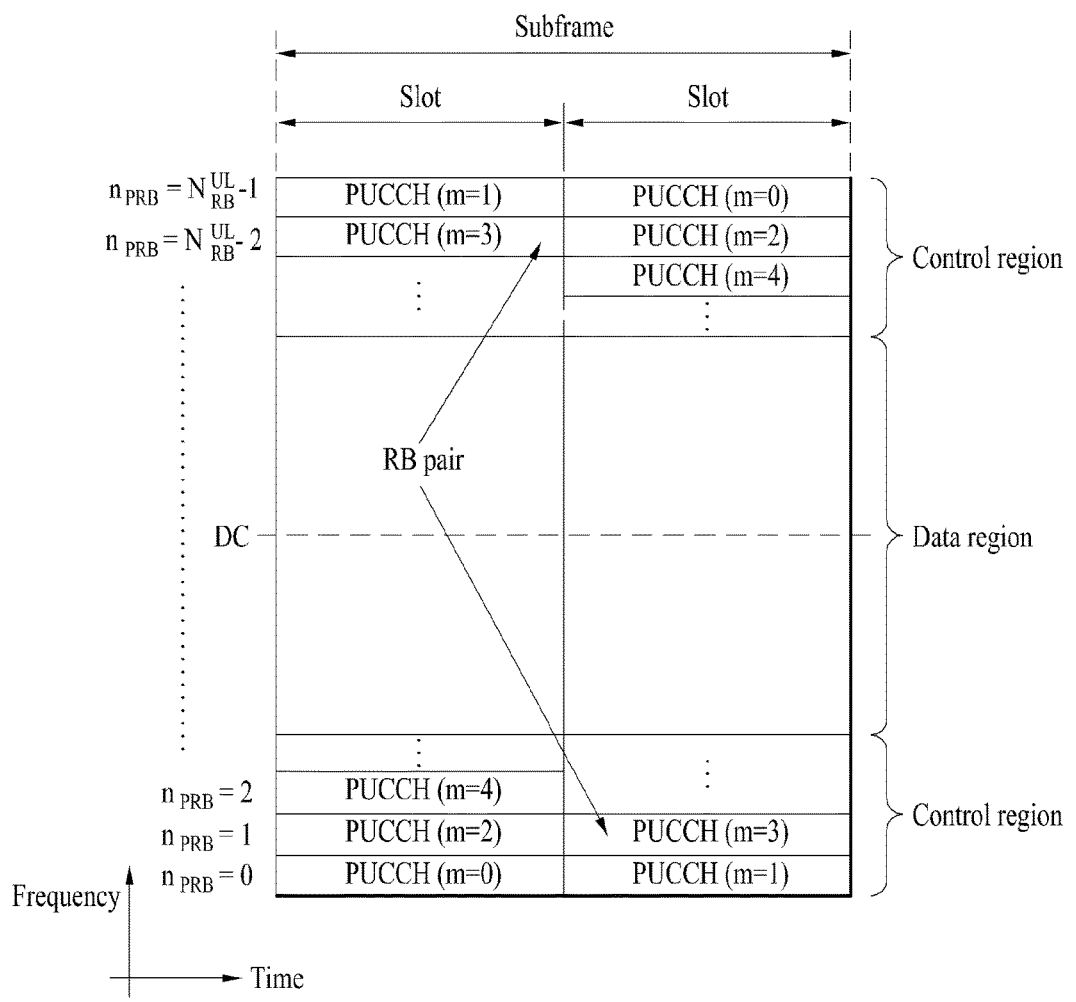
FIG. 6 illustrates the structure of a UL subframe used in a wireless communication system.

FIG. 6 illustrates the structure of a UL subframe used in a wireless communication system.

Referring to FIG. 6, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

A description will be given of HARQ (Hybrid Automatic Repeat and reQuest) in a wireless communication system.

When a plurality of UEs having data to be transmitted on uplink/downlink is present in a wireless communication system, an eNB selects UEs which will transmit data in each transmission time interval (TTI) (e.g. subframe). In a system using multiple carriers or the like, particularly, an eNB selects UEs which will transmit data on uplink/downlink in each TTI and also selects a frequency band used for each selected UE to transmit data.

In an uplink operation, UEs transmit reference signals (or pilot signals) on uplink and the eNB checks channel states of the UEs using the reference signals transmitted from the UEs and selects UEs that will transmit data on uplink in respective unit frequency bands in each TTI. The eNB signals the result of selection to the UEs. Specifically, the eNB transmits, to a UE that is uplink-scheduled in a specific TTI, an uplink assignment message indicating that the UE is permitted to send data using a specific frequency band. The uplink assignment message is also referred to as a UL grant. The UE transmits data on uplink according to the uplink assignment message. The uplink assignment message fundamentally includes a UE ID, RB allocation information, a payload and the like and may additionally include an incremental redundancy (IR) version, a new data indicator (NDI) and the like.

When a synchronous non-adaptive HARQ scheme is applied, and a UE scheduled in a specific TTI performs retransmission, a retransmission time is appointed systematically (e.g. after 4 subframes from a NACK reception time). Accordingly, the eNB sends a UL grant message to a UE in initial transmission only and retransmission is performed according to an ACK/NACK signal. When an asynchronous adaptive HARQ scheme is applied, a retransmission time is not appointed between the eNB and the UE and thus the eNB needs to send a retransmission request message to the UE. In addition, since a frequency resource or MCS for retransmission varies with transmission time, the eNB needs to transmit a HARQ process index, IR version and NDI information with a UE ID, RB allocation information and a payload when sending the retransmission request message.

Figure 7:
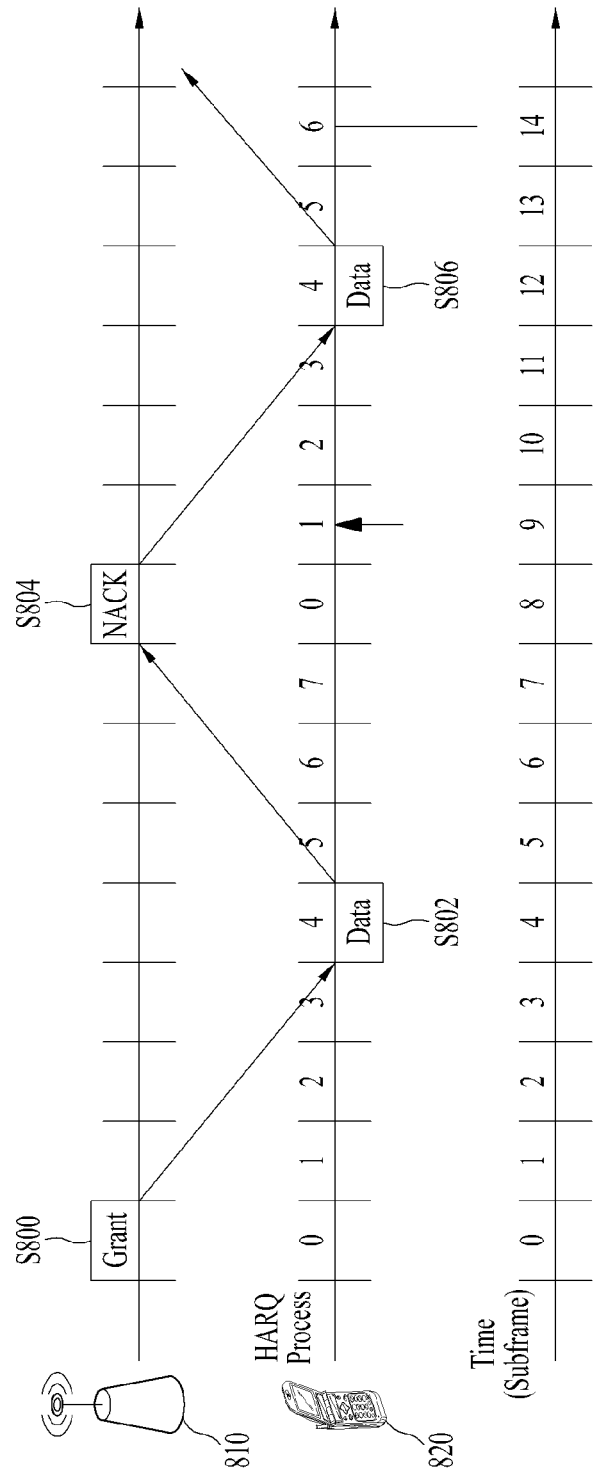
FIG. 7 illustrates a UL HARQ operation in LTE.

FIG. 7 illustrates a UL HARQ operation in LTE. In LTE, the UL HARQ scheme uses synchronous non-adaptive HARQ. When 8-channel HARQ is used, HARQ process numbers of 0 to 7 are provided. One HARQ process operates per TTI (e.g. subframe). Referring to FIG. 7, an eNB 810 transmits a UL grant to a UE 820 through a PDCCH (S800). The UE 820 transmits uplink data to the eNB 810 using an RB and an MCS, which are designated by the UL grant, after 4 subframes (e.g. subframe 4) from when the UL grant is received (e.g. subframe 0) (S802). The eNB decodes the uplink data received from the UE 820 and then generates ACK/NACK. When the eNB 810 fails to decode the uplink data, the eNB 810 transmits NACK to the UE 820 (S804). The UE 820 retransmits the uplink data after 4 subframes from when the NACK is received (S806). Here, initial transmission and retransmission of the uplink data are performed through the same HARQ process (e.g. HARQ process 4).

A description will be given of a DL/UL HARQ operation in an FDD system.

Figure 8:
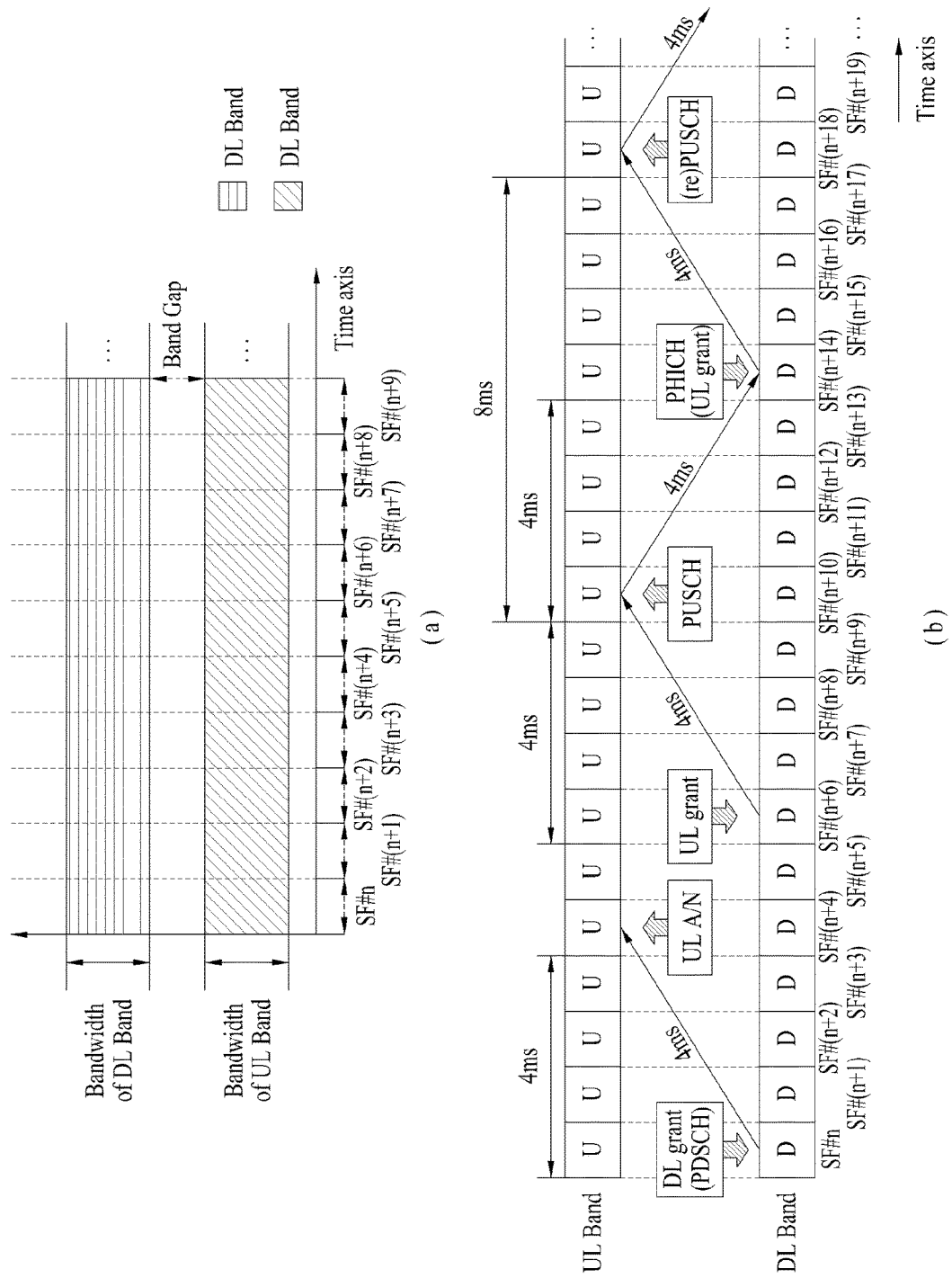
FIG. 8 illustrates an FDD system and a DL/UL HARQ timeline.

FIG. 8 illustrates an FDD system and a DL/UL HARQ timeline. In the FDD system as illustrated in FIG. 8(a), downlink/uplink data corresponding to specific uplink/downlink data is received after 4 ms. Referring to FIG. 8(b), for example, transmission of UL ACK/NACK for a PDSCH is started after 4 ms from when the PDSCH/downlink grant (DL grant) is received. A PUSCH corresponding to a UL grant/PHICH is transmitted after 4 ms from when the UL grant/PHICH is received, and a PHICH/UL grant corresponding to PUSCH transmission/retransmission are received after 4 ms from the PUSCH transmission/retransmission time.

In 3GPP LTE, synchronous HARQ is used for UL HARQ operation and asynchronous HARQ is used for DL HARQ operation. Synchronous HARQ is a scheme in which retransmission is performed at a time determined by the system when initial transmission fails. That is, a time with respect to uplink data transmission/retransmission related to a specific HARQ process or a UL grant/PHICH timeline is predefined and cannot be arbitrarily changed. In asynchronous HARQ, retransmission of data that has not been transmitted through initial transmission can be performed at an arbitrary time after 8 ms, including initial transmission time.

In FIGS. 7 and 8, each HARQ process is defined by a 3-bit HARQ process identifier and a receiving end (i.e. a UE in a downlink HARQ process and an eNB in an uplink HARQ process) requires independent soft buffer allocation for combination of retransmitted data.

In the following, TTI bundling is explained.

PUSCH VoIP of a legacy LTE system (e.g., Release-8/9/10) uses TTI bundling to expand coverage. The TTI bundling corresponds to a technology of repeatedly transmitting a packet as much as TTI corresponding to a bundling size (e.g., 4).

Figure 9:
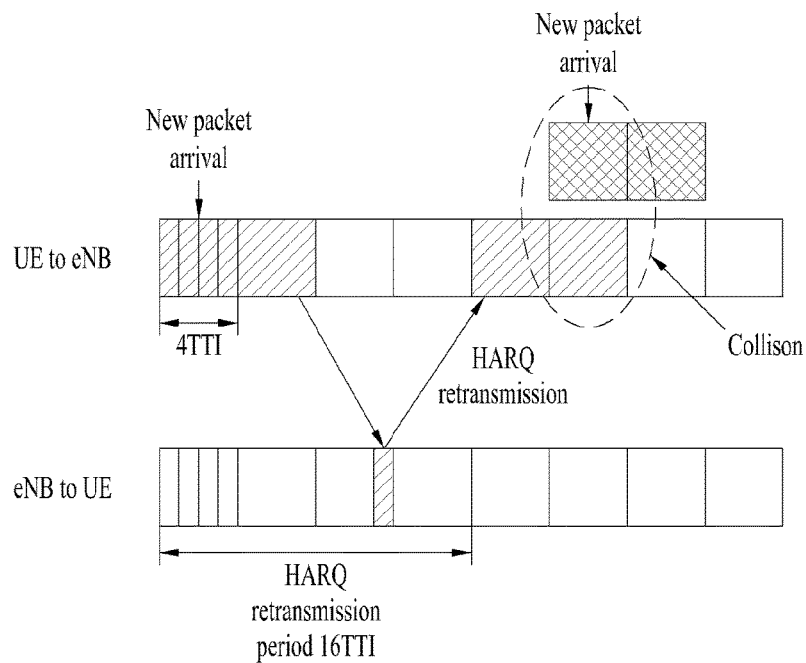
FIG. 9 is a diagram for explaining TTI bundling.

FIG. 9 is a diagram for comparing redundancy with each other according to whether or not TTI bundling is used.

FIG. 9 shows an example of using 4 TTI bundling. If the TTI bundling is not used, an RLC header and an MAC header are transmitted in every TTI. On the contrary, if the TTI bundling is used, since one RLC header and one MAC header are included in 4 TTIs, it is able to reduce the RLC header and the MAC header. That is, if the TTI bundling is used, it may be able to obtain an effect of reducing redundancy. Compared to a case of not using the TTI bundling, 4 TTI bundling may have an effect of reducing overhead as much as 120 bits. If the effect is represented by a ratio, 4 TTI bundling may have an effect of reducing overhead as much as 7.6%.

An UL HARQ process of a legacy FDD system is explained in the following. If a user equipment (UE) transmits data in an nth subframe, the UE receives PHICH ACK/NACK (A/N) from a base station in an (n+4)th subframe. Having received the NACK, the UE performs retransmission in an (n+8)th subframe. In this case, if 4 TTI bundling is used, since the nth, (n+1)th, (n+2)th, and (n+3)th subframes form an one time bundled packet, the base station receives the last (n+3)th subframe and then transmits A/N after minimum 4 subframes and the UE performs retransmission again after minimum 4 subframes. If TTI bundling is used to make a multiple of 8 corresponding to a legacy HARQ period, retransmission is performed in an (n+16)th subframe. Hence, a retransmission period for a 4 TTI bundling corresponds to 16 TTIs. This may indicate that maximum 3 retransmissions of TTI bundling are assigned to satisfy a strict constraint (i.e., 50 ms) for VoIP waiting time (latency) or 4 retransmissions are assigned to satisfy a less strict constraint (i.e., 52 ms) for the waiting time (latency) in an air-interface. In addition to the constraint, it may consider that a transfer rate of a VoIP packet arrived at a physical layer from a higher layer corresponds to 20 ms.

In summary, in a legacy LTE system, a size of TTI bundling corresponds to 4 and a redundancy version (RV) has been transmitted in an order of RV 0, 2, 3 and 1. Yet, since the bundling size is fixed to 4, it was difficult to perform TTI bundling in a part of UL/DL configurations of TDD.

In the following description, a case of using TTI bundling by changing a size of the TTI bundling and various matters related to the TTI bundling are explained. In particular, the following description can be applied to transmission and reception of a TDD and/or a D2D signal. According to an embodiment of the present invention, it may use various bundling sizes such as 2, 3, 4, 5, 6 and the like in case of performing TTI bundling. In the following, for clarity, assume that the number of RVs corresponds to 4 and a turbo code corresponds to 1/3 of a coding rate. Of course, a scope of the present invention may be non-limited by the number of RVs and the coding rate. It may use RVs of a different number and a different coding rate as well. FIG. 6 shows RVs defined in a system to which circular buffer rate matching is applied. Assume that a space between RVs corresponds to a result of dividing a size of all circular buffers by the number of RVs. First 1/3 part 601 corresponds to a part including many systematic bit parts or systematic bits. The remaining 2/3 part corresponds to a parity part. Hence, an RV 0 may correspond to an RV including the largest number of systematic bits or an RV including systematic bits only in the following.

Definition of TTI bundling size and RV order

If a size (the number of subframes included in a bundle) of TTI bundling is greater than the number of RVs, an RV 0 and/or an RV 1 can be transmitted in a subframe exceeding the number of RVs. Or, if a size of TTI bundling is greater than the number of RVs, an RV including systematic bits only can be transmitted in a subframe exceeding the number of RVs. In this case, it may be able to obtain SNR gain in a manner of more frequently transmitting a systematic bit or an RV including the large number of systematic bits.

It may also be able to obtain SNR gain in a manner of including an RV 0 in every bundle not only for a case that a size of TTI bundling is greater than the number of RVs but also for a case that the size of TTI bundling is less than the number of RVs. In other word, an RV 0 (an RV including the largest number of systematic bits or an RV including systematic bits only) can be definitely transmitted in a subframe from among subframes corresponding to a bundle. In this case, RVs included in a bundle together with the RV 0 can be circulated in an order of 0, 2, 3 and 1 or can be determined according to a specific different order.

And, an RV order can be determined according to a size of TTI bundling. In the following, RVs, which are transmitted according to a size of TTI bundling, are explained in more detail. In the following description, a serial number of two or more digits (e.g., 02) corresponds to an RV number and bundles are distinguished from each other on the basis of an arrow. For example, in case of 02->31, first transmission is performed in an order of an RV 0 and RV 2 of a bundling size 2 and next transmission can be performed in an order of an RV 3 and RV 1.

If a size of TTI bundling corresponds to 2, it may able to transmit RVs according to a legacy RV order in a manner of matching the legacy RV order with each TTI bundling size such as 02->31->02->31->02. In particular, an RV 0 and RV 2 are transmitted at first transmission, an RV 3 and an RV 1 are transmitted at retransmission, and the RV 1 and the RV 2 are transmitted again at next retransmission. Yet, this is just an example. Such an RV order as 0, 1, 2 and 3 can be determined in advance and RVs can be transmitted in an order of 01->23 in a manner of matching the RV order with a TTI bundling size.

Or, it may be able to include an RV 0 in every bundle/retransmission like 02->01->03->02. An RV transmitted together with the RV 0 may change in every retransmission. As a different embodiment, it may also be able to transmit the RV 0 in a manner of selecting two from a legacy RV order like RV 02->02->02.

If a size of TTI bundling corresponds to 3, 3 RVs are sequentially transmitted according to a legacy RV order in such an order as 023->102->310->231->023. In this case, it may be able to change an RV order in each bundling or change an order of an RV group when retransmission is performed. For example, it may use such a modified order as 023->012->013->123->023 and 012->023->013->123->012. When a bundle size corresponds to 3, it may be able to transmit an RV 0 in every bundle to more frequently transmit the RV 0. For example, the RV 0 can be transmitted in such an order as 023->013->012->023. As a different embodiment, it may also be able to transmit the RV 0 in a manner of selecting three from a legacy RV order like RV 023->023->023. As mentioned in the foregoing description, an RV transmitted with the RV 0 may change.

If a size of TTI bundling corresponds to 5, RVs can be sequentially transmitted via 5 TTI bundles according to a legacy RV order in such an order as 02310->23102->31023->10231->02310. In this case, it may be able to change an RV order in each TTI bundling or change a transmission order between TTI bundles. In particular, since a size of a TTI bundle is greater than 4 corresponding to the number of RVs, it may be able to transmit an RV 0 or an RV 1 one more time in a corresponding subframe, i.e., additional TTI. For example, it may be able to transmit RVs in such an order as 02310->02311->02310 or 02310->02310. Or, a position of an RV, which is transmitted one more time, may change in a manner of transmitting the RV 0 before a legacy order (0231) and transmitting the RV 0 after the 0231 in such an order as 00231->023100->00231.

If a size of TTI bundling corresponds to 6, RVs can be sequentially transmitted via 6 TTI bundles according to a legacy RV order in such an order as 023102->310231->023102. And, an RV 0 and/or an RV 1 are transmitted one more time in additional TTI. For example, the RV 0 and/or the RV 1 can be transmitted in such an order as 020301->020301 or 023100->023100. Or, a position of an RV, which is transmitted two times, may change in a manner of transmitting the RV 0 two times before a legacy order (0231) and transmitting the RV 0 two times after the 0231 in such an order as 000231->023100->000231.

Meanwhile, a size of a bundle in a previous transmission may be different from a size of a bundle in a next transmission. For example, a size of a bundling can be respectively (differently) configured in a first transmission and a next transmission. That is, it may be able to use a flexible TTI bundling. In case of using the flexible TTI bundling, RVs can be transmitted in each bundle according to the aforementioned description. Specifically, for example, if a TTI size exceeds 4, an RV 0 can be always transmitted in additional TTI. In particular, if a bundle size corresponds to 6->4->4->4, 2 TTIs out of 6 TTIs of the first bundle can transmit an RV 0. In this case, a position at which an additional RV 0 is transmitted can be configured in various ways including 023100, 000231, 020031, 023001, 020301, etc. Or, RVs can be transmitted in a manner of being circulated according to an order of 0231 irrespective of a bundle size. For example, if a bundle size varies like 4->6->4->4, RVs can be transmitted in such an order as 0231->023102->3102->3102. In this case, it is able to see that an RV order is changed at 4 TTI bundle after a TTI bundle other than 4 is transmitted.

Meanwhile, if a TTI bundling is configured, QPSK (quadrature phase shift keying) modulation is usable only. Hence, an MCS field of a DCI format 0 can use a specific state only. Hence, the remaining MCS field can be used for a usage of dynamically configuring/indicating an RV. Specifically, if a TTI bundling is configured, the remaining part of the MCS field can indicate an RV of an UL subframe interlocked with DCI. Or, the remaining part of the MCS field can indicate an RV only when a TTI bundling is configured and a bundle size exceeds 4. If an indication related to an RV does not exist in the MCS field, RVs are transmitted according to a predetermined order (one of the aforementioned orders). If an indication on an additional TTI bundle exists, a UE can transmit a corresponding RV.

In a next-generation system beyond 3GPP LTE(-A) (beyond LTE-(A) system), a low-cost/low-specification UE based on data communication such as meter reading, water level measurement, use of a surveillance camera, and inventory reporting of a vending machine is considered. Hereinafter, such a UE is referred to as an MTC device or an MTC UE. Since less data is transmitted by the MTC UE and many MTC UEs operate in one cell, if signal transmission for UL/DL scheduling/feedback is performed for each MTC UE at every moment, eNB overhead remarkably increases. In particular, if transmissions of UL data/feedback performed by the MTC UE are intermittent and not persistent, an eNB cannot persistently maintain UL time/frequency synchronization of the MTC UE. Therefore, for power saving of the MTC UE, it is desirable to perform UL data/feedback transmission by the MTC UE according to a random access preamble based RACH procedure.

Meanwhile, a situation in which a plurality of MTC UEs that perform the same/similar functions in a coverage-limited space such as a specific building or warehouse are deployed/operated may be considered. Hereinafter, a plurality of MTC UEs that perform the same/similar functions in a coverage-limited space will be referred to as an MTC group. The MTC group may be implemented to intermittently transmit low volumes of data. Particularly, in the case of UL synchronization, since the MTC UEs are adjacent to each other in a coverage-limited space, there is a high probability that UEs that belong to the same MTC group have similar time/frequency synchronization.

Since an MTC UE is used to transmit less data and perform occasionally generated UL/DL data transmission/reception, it is efficient to lower the cost of the UE and reduce battery consumption according to the low data transmission rate. In addition, the MTC UE has low mobility and, therefore, a channel environment thereof rarely changes. Meanwhile, in consideration of up to a poor situation in which the MTC UE is installed in a coverage-limited place such as a basement as well as a building or a factory, various coverage enhancement schemes including a repetitive transmission method for the MTC UE with respect to each channel/signal have been discussed.

Figure 10:
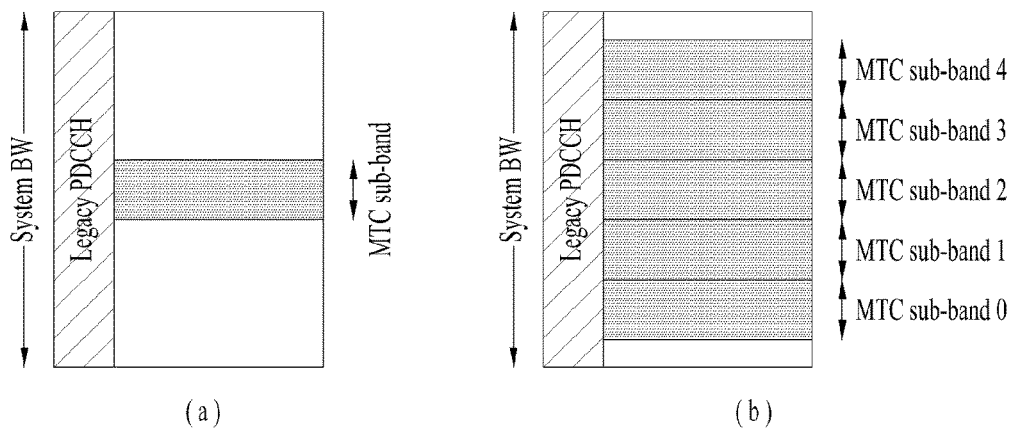
FIG. 10 is a diagram for an example of a bandwidth configuration for MTC capable of being applied to one embodiment of the present invention.

As technology for a low-cost/low-specification UE, decrease in the number of reception antennas, decrease in a maximum transport block (TB) size, reduction in the operating frequency bandwidth (BW) of the UE, and the like, may be considered. In particular, reduction of the operating BW of the UE may be implemented such that the MTC UE can perform a signal transmission/reception operation only with respect to a predetermined BW (e.g. 1.4 MHz or 6 RBs) narrower than an actual system BW (e.g. 20 MHz or 100 RBs) in terms of radio frequency (RF) and/or baseband (BB) signal processing. If a minimum of 6 RBs is used for the system BW of the MTC UE, the MTC UE can advantageously discover/detect a cell that the MTC UE is to access by receiving and/or detecting a legacy PSS/SSS/PBCH. FIG. 10 is a diagram for a system BW or sub-band region for the MTC UE.

Referring to FIG. 10, PDCCH in a legacy system (hereinafter, legacy PDCCH) is transmitted on the whole band, whereas a signal for an MTC UE can be transmitted on a subband region corresponding to a part of the whole band. In this case, as shown in FIG. 10(*a*), the subband region in which the MTC UE operates may correspond to a center region (e.g., center 6 PRBs) of a cell all the time. Or, as shown in FIG. 10(b), it may be able to configure a plurality of subbands for the MTC UE for multiplexing between MTC UEs in a subframe. In this case, it may be able to use a different subband between UEs. Or, it may use a different subband instead of the center 6 PRBs while an identical subband is used between UEs.

Meanwhile, in a legacy system, in the case of various DL control channels (e.g. a PCFICH and a PHICH) including a PDCCH, REs/REGs/CCEs constituting the control channels are transmitted over/throughout an entire system BW through a series of procedures such as interleaving and cyclic shift as illustrated in FIG. 4. When the UE needs to receive the control channel based on an entire system band of a connected RF, it is difficult to implement the UE with low-cost/low-specification. If the MTC UE is configured by the subband, the MTC UE is unable to properly receive legacy PDCCH transmitted via the whole system band. If PDCCH for the MTC UE is transmitted in an OFDM symbol region in which the legacy PDCCH is transmitted, it is not preferable due to a multiplexing issue with PDCCH transmitted to a different UE.

As a solution for this, it is necessary to introduce a control channel which is transmitted in a sub-band in which MTC is operating for the MTC UE. In order to introduce a downlink control channel for the low-complexity MTC UE, it may use legacy EPDCCH as it is or it may be able to introduce a control channel corresponding to a variation of the legacy EPDCCH. In the present invention, a physical downlink control channel introduced for the low-complexity MTC UE or a normal complexity MTC UE is commonly referred to as EPDCCH. For the same reason, a physical downlink shared channel transmitted to the MTC UE is also restricted to a sub-band received by a UE.

The present invention is explained under the assumption that a corresponding sub-band or a narrow band is set to a UE in advance. In other word, the present invention is explained under the assumption that the UE knows a sub-band set to the UE. The sub-band set to the UE can be changed into a different sub-band instead of being fixed.

The present invention is explained under the assumption that a downlink channel proposed by the present invention is used for the MTC UE. Yet, it is apparent that the present invention can also be applied to a case of using the downlink channel for a different general UE rather than the MTC UE.

When an MTC UE is in a situation that signal reception power is very low due to channel attenuation from an eNB, it may be able to operate the MTC UE by repeating a channel transmitted by the eNB over a plurality of subframes. The UE receives sufficient energy via the repetitive transmission and is able to decode a channel. The number of repetition appropriate for a UE varies according to a communication status of each UE, i.e., channel quality with the eNB. In particular, the less number of repetitions is sufficient for a UE located at a position relatively near the eNB, whereas it is necessary to use more subframes for repetitive transmission for a UE located at a position far from the eNB. Hence, in order to make a UE maintain the optimized number of repetitive transmission, it may be preferable to preferentially receive a report on a channel state of the UE and configure the transmission count to the UE appropriate for the UE.

In this case, it is also necessary to repeatedly transmit a configuration message of the transmission count. Since the number of repetition configuration message should be transmitted before the number of repetition is configured, it is necessary to determine the number of repetition of the number of repetition configuration message using a separate method.

In this case, the number of repetition corresponds to the number of subframes in which (E)PDCCH or PDSCH carrying the same information is repeated. More generally, the meaning of the number of repetition can be extended to a series of information indicating when initial transmission is performed and a subframe in which repetitive transmission is performed. Of course, the number of repetition configuration can also be set to uplink (i.e., PUSCH or PUCCH). In general, the number of repetition configuration in UL may be different from the number of repetition configuration in DL.

In order to indicate an RE to which repeatedly transmitted various channels are mapped, it may use a configuration (rate matching configuration) message. The configuration message should be forwarded to a UE before the UE receives a corresponding channel. Since it is also necessary to apply consistent rate matching to the rate matching configuration message, a method for solving the problem is necessary.

In this case, for example, a rate matching pattern can be determined based on an RE of a subframe in which a CSI-RS is configured, a subframe configured as an MBSFN subframe to omit CRS transmission in a PDSCH region, a symbol at which transmission of PDSCH or EPDCCH starts, and the like.

In the following, the number of repetition configuration message and the rate matching configuration message are commonly referred to as a configuration message or configuration information and a method of efficiently forwarding the configuration message in an MTC UE operation is explained.

Partial information of the configuration message can be commonly applied to (E)PDCCH and PDSCH or can be separately applied to (E)PDCCH and PDSCH. The configuration message can include additional information. For example, information on a position of a time/frequency resource in which (E)PDCCH or PDSCH commonly received by a plurality of UEs is transmitted can be included in the configuration message. For example, position information of common search space can be included in the configuration message.

In a step that a UE initially accesses a cell, first of all, the UE reads PSS/SSS/PBCH and obtains synchronization for the cell. Subsequently, the UE reads SIB and then receives various cell-specific configuration messages of the cell. In this case, since SIB for a legacy UE is transmitted via a legacy PDCCH incapable of being received by an MTC UE and repetitive transmission is not applied to the SIB, it may be able to assume that the MTC UE is unable to receive the SIB. Hence, an eNB may transmit a separate SIB to the MTC UE. The separate SIB is referred to as an MTC-SIB. In order to make the MTC UE receive the MTC-SIB, the MTC-SIB is transmitted via a subband received by the MTC UE only. The MTC-SIB has an attribute capable of applying repetitive transmission.

The eNB is unable to identify the number of repetition appropriate for an individual UE until the MTC UE reads the MTC-SIB. Hence, the MTC-SIB is transmitted using a common (default) configuration which is commonly applied to a plurality of UEs. The common configuration can be designated using one or combination of methods described in the following.

A default configuration is designated via PBCH

A default configuration is designated via standard or a pre-configuration of a UE in advance A default configuration is induced from a cell ID Of course, a part of the common configuration is designated using a specific method, whereas another part of the common configuration can be designated by a different method. For example, the number of repetition among the common configuration is designated via PBCH, whereas a default rate matching pattern can be designated by a standard.

The common configuration may have a conservative characteristic compared to a UE-specific configuration corresponding to a configuration of an individual UE.

For example, in case of the number of repetition, the number of repetition of the common configuration may be greater than the number of repetition of the UE-specific configuration.

For example, in case of the rate matching pattern, the rate matching pattern of the common configuration may correspond to a subset of the rate matching pattern of the UE-specific configuration. That is, if (E)PDCCH or PDSCH RE mapping is performed in an RE of the common configuration, RE mapping can be performed in the UE-specific configuration as well.

If a channel resource is commonly received by a UE in the common configuration, the channel resource of the common configuration may correspond to a subset in the UE-specific configuration. That is, if a channel resource corresponds to a commonly received channel resource in the common configuration, the channel resource corresponds to a commonly received channel resource as well in the UE-specific configuration.

This is because, if it follows the aforementioned method, flexibility of the common configuration is considerably reduced. Although a predetermined case or other method is used, due to a restriction on the number of bits in PBCH or a restriction on the number of cell IDs, it is able to select one of restricted configurations only. Since it is necessary to provide many different UE-specific configurations in a cell formed by the restricted number of common configurations, it is preferable that the common configuration has s conservative characteristic.

In case of a rate matching pattern, if it is able to set a limit on a resource to which the common configuration is applicable, a rate matching pattern of the UE-specific configuration may become a subset of a rate matching pattern of the common configuration. If (E)PDCCH or PDSCH RE mapping is performed in an RE according to the UE-specific configuration, RE mapping can be performed according to the common configuration as well. For example, in case of a CSI-RS, since the common configuration does not have a CSI-RS, a channel to which the common configuration is applied can be transmitted only in a subframe in which a CSI-RS does not exist.

In the following, one embodiment of arriving at a UE-specific operation by performing common configuration is explained in detail. In particular, an embodiment of arriving at the UE-specific operation via an initial access procedure is explained.

When a UE is powered on or enters a new cell, the UE performs initial cell search. The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH.

If the UE initially accesses the eNB or has no radio resources for signal transmission to the eNB, the UE may perform a random access procedure with the eNB. In the random access procedure, the UE may transmit a predetermined sequence as a preamble on a Physical Random Access Channel (PRACH) and may receive a response message to the preamble on a PDCCH and a PDSCH associated with the PDCCH. In the case of a contention-based RACH, the UE may additionally perform a contention resolution procedure.

More specifically, the random access procedure can perform 4 steps described in the following according to a contention-based random access procedure. The contention-based random access procedure includes the 4 steps described in the following in the aspect of a UE. Messages transmitted via the 4 steps can be referred to as message (Msg) 1 to 4 in the present invention.

Step 1: RACH preamble transmission via PRACH (Msg1, from UE to eNB in UL)

Step 2: Random access response reception via PDCCH and PDSCH (Msg2, from eNB to UE in DL)

Step 3: Layer 2/Layer 3 message transmission via PUSCH (Msg3, from UE to eNB in UL)

Step 4: Contention resolution message reception (Msg4, from eNB to UE in DL)

On the other hand, a dedicated random access procedure consists of the following three steps. Messages transmitted via the 3 steps can be referred to as message (Msg) 0 to 2 in the present invention. Although it is not mentioned in each step, it may also perform uplink transmission (i.e., step 3) corresponding to RAR (Random Access Response) as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (Msg 0, from eNB to UE in DL)

Step 1: RACH preamble transmission via PRACH (Msg 1, from UE to eNB in UL)

Step 2: Random access response reception via PDCCH and PDSCH (Msg 2, from eNB to UE in DL)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI in a time window. If RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is received.

UE-specific Configuration in DL

In the following, a random access procedure according to embodiment of the present invention is explained under the assumption of a contention-based random access for clarity. Hence, messages of steps 0 to 4 are referred to as Msg 1 to Msg 4. A UE attempts a random access via MTC-SIB transmitted using the common configuration rather than the SIB. Subsequently, the UE transmits a RACH preamble (MSG1) and receives a random access response message (MSG2).

In this case, it is necessary to determine a configuration to be applied to receive the MSG2. Since an eNB does not identify a coverage status of the UE yet, it is preferable to use a configuration common to a plurality of UEs.

For example, a configuration applied to the MSG2 can be inferred from the common configuration, which was used to receive the MTC-SIB. More specifically, the number of repetition applied to the MSG2 can be determined by a value resulted from multiplying the number of repetition of the common configuration by a predetermined coefficient. The coefficient can be determined through a ratio between the number of repetition necessary for the MSG2 and the number of repetition necessary for the MTC-SIB in a normal situation. Of course, the configuration used for receiving the MSG2 may be identical to the common configuration.

If the MSG2 is received using the common configuration or a configuration inferred from the common configuration, both (E)PDCCH for scheduling the MSG2 and PDSCH for forwarding the MSG2 itself can be received according to the configuration. Or, (E)PDCCH for scheduling the MSG2 can be received according to the configuration. In this case, a configuration to be applied to PDSCH can be designated via (E)PDCCH.

The MSG2 schedules an uplink resource configured to transmit information necessary for an individual UE in a random access procedure. A UE transmits the information (MSG3) via the scheduled resource. Having received the MSG3, an eNB transmits a message (MSG4) for terminating the random access procedure. Of course, the UE should determine a configuration to be used for receiving the MSG4. The configuration to be used for receiving the MSG4 can be determined using one of methods described in the following.

Method 1: Similar to the MSG2, a configuration used for receiving the MSG4 is inferred from the common configuration. This also includes applying the common configuration as it is.

Method 2: A configuration used for receiving the MSG4 is informed via the MSG2. Since the MSG4 corresponds to a message transmitted to an individual UE, it is able to consider a configuration transmitted via the MSG2 as a UE-specific configuration. In this case, it may be able to apply the UE-specific configuration to a channel on which a user data is forwarded. An eNB determines a channel state of an individual UE based on reception quality of the MSG1, selects an appropriate configuration, and forwards the selected configuration via the MSG2.

In case of using the method 1, since the MSG4 is received via the common configuration, the UE-specific configuration is not applied yet. Then, it is necessary to forward the UE-specific configuration to be used for receiving a channel in a procedure after a random access. To this end, it may be able to use two methods described in the following.

Method 1-1: A UE-specific configuration is forwarded via the MSG4. In order to make an eNB set an appropriate UE-specific configuration, a UE can report CSI or RSRP/RSRQ measurement via the MSG3.

Method 1-2: A UE-specific configuration is forwarded via (E)PDCCH and PDSCH transmitted to a UE. A common configuration or a configuration inferred from the common configuration can be applied to the (E)PDCCH and the PDSCH on which the UE-specific configuration is forwarded. This indicates that a UE receives a part of the (E)PDCCH and the PDSCH via the common configuration and receives another part of the (E)PDCCH and the PDSCH via the UE-specific configuration. For example, (E)PDCCH on a common search space and/or PDSCH scheduled through the (E)PDCCH follow the common configuration, whereas (E)PDCCH on a UE-specific search space and/or PDSCH scheduled through the (E)PDCCH may follow the UE-specific configuration.

In case of using the method 1-2, the (E)PDCCH/PDSCH to which the common configuration is applied can be distinguished from the (E)PDCCH/PDSCH to which the UE-specific configuration is applied in time. In particular, the (E)PDCCH/PDSCH is received in a first subframe set according to the common configuration, whereas the (E)PDCCH/PDSCH is received in a second subframe set according to the UE-specific configuration. According to the present method, since a configuration to be received by a UE at single timing has such a characteristic as a single configuration, it is able to prevent complex implementation such that the UE attempts to receive (E)PDCCH/PDSCH using a plurality of configurations at the same time.

Among channels capable of using the aforementioned common configuration, the MTC-SIB may differ from the MSG2 or the MSG4. This is because the MTC-SIB corresponds to a channel transmitted all the time, but the rest of channels correspond to channels transmitted only when a random access procedure operates. In particular, the MTC-SIB is consistently transmitted via a predetermined time/frequency resource without (E)PDCCH scheduling the MTC-SIB or the number of repetition and a UE appropriately combines the PDSCH in accordance with a coverage situation of the UE to attempt reception.

When the aforementioned method is used, if a problem occurs on the UE-specific configuration (e.g., if it is necessary to have the number of repetition greater than the number of repetition of the UE-specific configuration due to the worse channel environment), it may be able to change the UE-specific configuration via a message that uses the common configuration. A specific method is described in the following in association with a method of transmitting/receiving the UE-specific configuration.

In case of using the method 1-1: If a UE detects a change of the UE-specific configuration while receiving/measuring a signal of an eNB (e.g., if the greater number of repetition is required due to the worse channel environment or it fails to properly receive a channel transmitted by an eNB for prescribed time), the UE attempts a random access. Then, the UE can receive a new UE-specific configuration via the MSG4.

In case of using the method 1-2: An eNB can change the UE-specific configuration at the timing preferred by the eNB via (E)PDCCH/PDSCH to which the common configuration is applied.

In case of using the method 2: Similar to the case of using the method 1-1. In this case, the UE-specific configuration is forwarded via the MSG2.

UE-specific Configuration in UL

The same principle can be used for performing/changing a UE-specific configuration for the number of repetition of UL. An eNB can broadcast a common configuration for a UL channel to UEs via a DL message (e.g., MTC-SIB, etc.) to which the common configuration is applied. Then, information on the UE-specific configuration is exchanged via DL and UL messages to which the common configuration is applied in the aforementioned procedure. In this case, it is necessary to determine UL transmission to which the common configuration is applied and UL transmission to which the UE-specific configuration is applied. To this end, it may be able to use methods described in the following.

Method 3-1: UL transmission is determined based on a scheduling DL channel to which a configuration is applied. That is, if UL transmission is scheduled by a DL channel using a DL common configuration, a UL common configuration is applied. If UL transmission is scheduled by a DL channel using a DL UE-specific configuration, UL UE-specific configuration is applied.

Method 3-2: Time/frequency domain to which a common configuration is applied is designated in advance.

Method 3-3: UL transmission is determined according to an attribute of (E)PDCCH that performs scheduling on the UL transmission. Specifically, the UL transmission is determined based on a DCI format, a DCI position in a search space, and the like.

Method 3-4: A configuration used for UL transmission can be indicated by a specific indicator. For example, an indicator indicating a configuration to be used is included in DCI that performs scheduling on UL transmission.

In the following, a method of configuring an MTC UE of the present invention is explained according to various embodiments. Of course, it is able to extensively apply the present invention not only to the embodiments described in the following but also to various situations.

Figure 11:
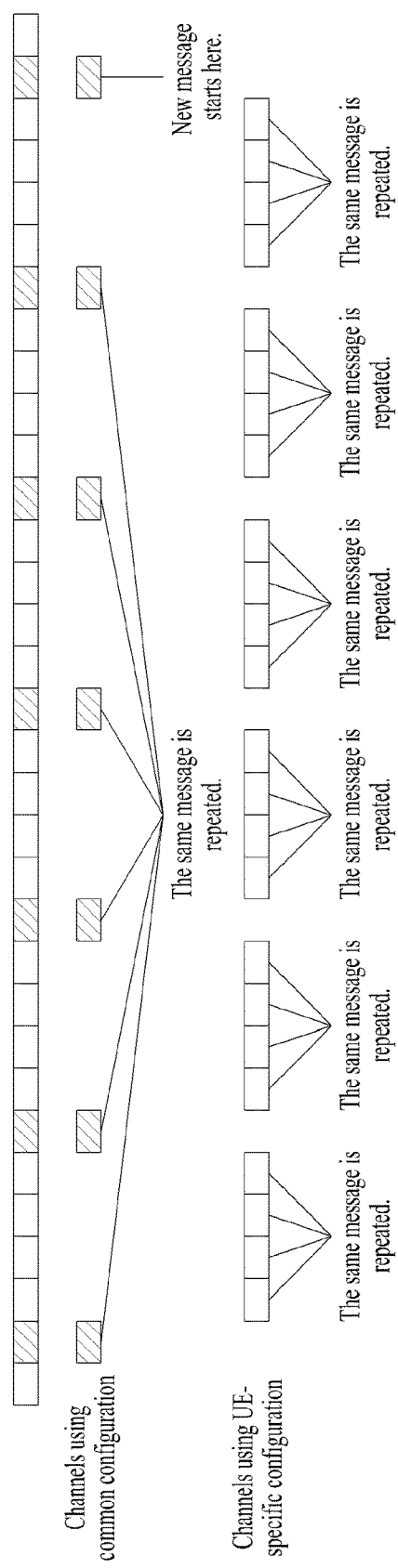
FIG. 11 is a diagram for an example of a case that a channel using a common configuration is distinguished from a channel using a UE-specific configuration in a subframe according to one embodiment of the present invention.

FIG. 11 shows a case of distinguishing a channel using a common configuration from a channel using a UE-specific configuration in a subframe according to one embodiment. In FIG. 11, assume a case that one in every five subframes is designated as a subframe using the common configuration and the remaining subframes use the UE-specific configuration. In case of using the common configuration, assume that the same message is repeated in 6 contiguous subframes. In case of using the UE-specific configuration, assume that the same message is repeated in 4 contiguous subframes.

If an operation shown in FIG. 11 is performed, since the channel using the common configuration is separated from the channel using the UE-specific configuration in time unit, it may be able to configure the channels to be separated from each other in a HARQ process as well.

For example, in case of PDSCH, it may be able to configure a partial process to be managed in PDSCH using the common configuration only and configure the remaining partial process to be managed in PDSCH using the UE-specific configuration only in a manner of dividing the HARQ process. If the abovementioned restriction is given, a UE divides HARQ processing capability of the UE and optimizes the divided HARQ processing capability to the common configuration and the UE-specific configuration, respectively.

The operation shown in FIG. 11 has a characteristic that subframes in which two channels are repeatedly transmitted are mixed. In other word, a channel can be repeatedly transmitted in subframes separated from each other. The characteristic has a merit in that time diversity is provided to an MTC-UE of low mobility. For example, when a channel 1 and a channel 2 are respectively repeated as many as 5 subframes, if repetitive transmission is performed in contiguous subframes, the transmission lasts for 5 ms in the aspect of each channel. Since a probability of considerably changing a channel during the transmission time is relatively low, if a channel state becomes poor once, it is highly probable that the poor channel state is maintained until the repetition ends. On the contrary, if the channel 1 is transmitted in every odd-numbered subframe and the channel 2 is transmitted in every even-numbered subframe, since each channel is transmitted over 9 ms, although a channel is in a poor channel state at the beginning, a probability of enhancing the channel state again before the transmission ends increases.

Figure 12:
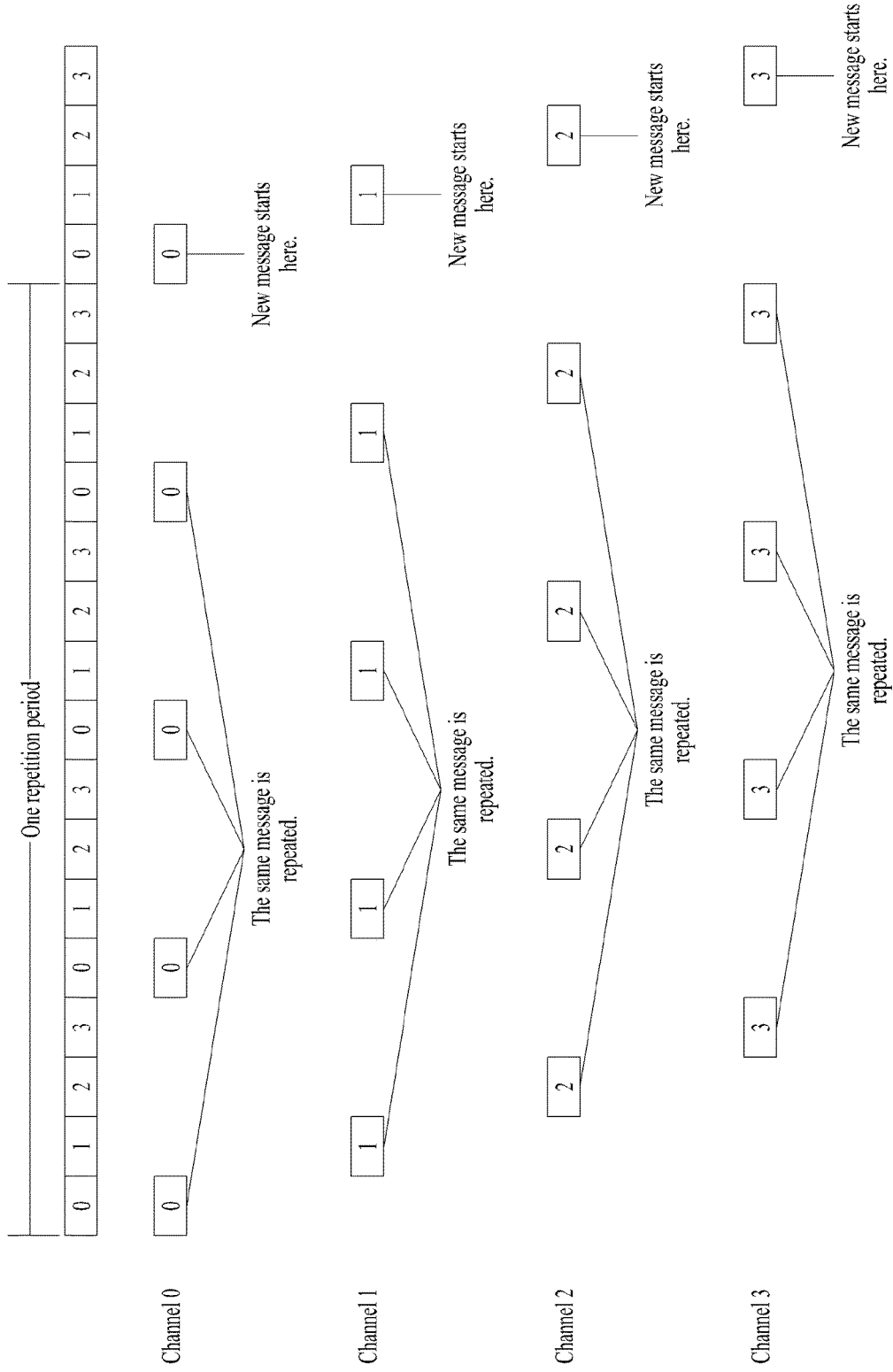
FIG. 12 is a diagram for a different example of a case that a channel using a common configuration is distinguished from a channel using a UE-specific configuration in a subframe according to one embodiment of the present invention.

FIG. 12 shows a different case of distinguishing a channel using a common configuration from a channel using a UE-specific configuration in a subframe according to one embodiment. Specifically, FIG. 12 shows a case that a plurality of subframe patterns in which an individual channel is repeated are defined and each of a plurality of the subframe patterns is mixed in time to additionally obtain the abovementioned advantage. In this case, assume a case that each channel is repeated in 4 subframes. In FIG. 12, subframes represented by the same number or the same index correspond to subframes in which the same information is repeatedly transmitted.

In order to provide the operation, in case of a UE-specific configuration, an eNB transmits a signal to a UE to inform the UE of subframes to be used for repetitive transmission of the same message. Or, a subframe repetition pattern can be automatically determined by the maximum number of HARQ processes in association with a method A described in the following. That is, if the maximum number of HARQ processes capable of being operated by a UE corresponds to N, one subframe repetition pattern can be configured in a form of occupying one subframe among N number of subframes.

As mentioned in the foregoing description, if there separately exists a subframe repetition pattern to which a common configuration is applied, a repetition pattern is firstly configured for the subframe repetition pattern and then N numbers of repetition patterns are configured for the remaining subframes to configure repetition patterns to which a UE-specific configuration is applied. In particular, if the repetition pattern is automatically determined, an eNB can designate start and end of actual repetitive transmission (in other word, start of the repetitive transmission and the number of repetition) via UE-specific signaling.

In case of DL, the same subframe repetition pattern can be commonly applied to (E)PDCCH and PDSCH. In this case, it may be able to regulate PDSCH, which is scheduled via (E)PDCCH of a specific repetition pattern, to be additionally transmitted on the same repetition pattern. By doing so, it may be able to omit overhead of signaling a relation between (E)PDCCH repetition pattern and PDSCH repetition pattern.

Or, it may be able to apply a different repetition pattern to (E)PDCCH and PDSCH for flexibility capable of differently controlling coverages of a control signal and a data signal. In this case, it may be able to designate a subframe repetition pattern used by the PDSCH which is scheduled via RRC or (E)PDCCH. Or, it may be able to indicate a repetition pattern of the PDSCH by a predetermined rule such as a first PDSCH repetition subframe pattern appearing after prescribed time from the timing at which (E)PDCCH transmission ends.

Or, it may apply a repetition pattern to (E)PDCCH only. In case of PDSCH, the PDSCH can be repeated in contiguous subframes without a separate repetition pattern.

In case of using a repetition pattern interleaved in a form shown in FIG. 12, it may be able to more efficiently design a method of managing a HARQ process. For example, a HARQ process can be designed using one or a combination of methods described in the following in the aspect of PDSCH reception.

Method A: One HARQ process is mapped to one subframe repetition pattern. In particular, if PDSCH transmitted by a specific subframe repetition pattern is retransmitted, the same subframe repetition pattern is used only. Referring to FIG. 12, assume that a UE has 4 HARQ processes in total and each HARQ process is used in each subframe repetition pattern.

This method has a merit in that repetitive transmission for implementing a reception circuit of a UE and HARQ retransmission are identically managed in respect that repetitive transmission of specific PDSCH and retransmission of HARQ operation are basically identical to each other in the aspect of receiving a coded bit of the same transport block.

Hence, repetitive transmission of a specific channel can also be referred to as automatic retransmission without ACK/NACK feedback. And, when retransmission is scheduled, since it is O.K. to simply notify whether it is retransmission or new transmission without designating a HARQ process ID, it may be able to replace a HARQ process ID field of several bits with a new data indicator (NDI) field of 1 bit in DCI of DL assignment.

Method B: There is no correlation between a HARQ process and a subframe repetition pattern. Hence, PDSCH, which is transmitted via a specific subframe repetition pattern, can be retransmitted via a different subframe repetition pattern. Yet, when a new PDSCH is received via a specific subframe repetition pattern, PDSCH including the same HARQ process ID can be scheduled via a different pattern.

For example, referring to FIG. 12, when PDSCH is received using a subframe pattern 0, PDSCH having the same HARQ process ID can be transmitted using a subframe pattern 2 after 2 ms. In this case, a UE operation can be performed using a method or a combination of methods described in the following.

Method B-1: The UE may consider it as an error case. According to the aforementioned example, the UE may assume the PDSCH scheduling in the subframe pattern 2 as an error.

Method B-2: The UE may consider the lately transmitted scheduling as a correct scheduling only and discards the previously received PDSCH. According to the aforementioned example, the UE discards the PDSCH of the subframe pattern 0 and receives PDSCH of a corresponding HARQ process using the subframe pattern 2 only.

Method B-3: The UE may consider the two scheduling as valid. The UE combines channels received via the two subframe repetition patterns to decode a transport block. According to the aforementioned example, the UE uses both the PDSCH of the subframe pattern 0 and the PDSCH of the subframe pattern 2 to decode a transport block of a corresponding HARQ process. By doing so, it may be able to effectively increase the number of repetition of a channel.

The detail methods (methods B-1 to B-3) of the method B can be differently applied according to whether or not a lately received scheduling message indicates a new data of the same HARQ process (i.e., whether or not NDI is toggled).

For example, if it is indicated to transmit a new data (i.e., if NDI is toggled), it may use the method B-1 under the assumption that transmission of a new data is not initiated in the same HARQ process until repetition is terminated. Or, it may use the method B-2 under the assumption that an eNB intentionally indicates to ignore a legacy data. On the contrary, if the transmission of the new data is not indicated (i.e., if NDI is not toggled), it may be able to apply the method B-3 under the assumption that the same transport block is transmitted using a plurality of repetition patterns.

As mentioned in the foregoing description, an operation of mixing a plurality of patterns in which the same message is repeatedly transmitted to a plurality of subframes in time domain can provide enhanced performance via time diversity even in a situation that a control channel such as (E)PDCCH is transmitted.

In this case, unlike PDSCH, the (E)PDCCH is unable to control a modulation and coding scheme according to a channel state, but control an aggregation level (AL), in other word, an amount of resources used for transmission. This is because a UE receives the (E)PDCCH without a separate control signal. To this end, in a legacy LTE system, the UE has a search space consisting of a plurality of (E)PDCCH transmission candidates and candidates different from each other can be configured to have a different AL. An eNB selects an appropriate AL in consideration of a current channel state, selects a candidate corresponding to the selected AL, and transmits (E)PDCCH to the UE. The UE detects whether or not DCI is transmitted to the UE to identify that the candidate is used for transmitting the (E)PDCCH to the UE.

In particular, a transmission resource of the (E)PDCCH can be dynamically controlled via a search space structure consisting of a plurality of candidates having a different AL. In order to utilize the method of dynamically controlling the (E)PDCCH transmission resource in accordance with the aforementioned principle of performing repetitive transmission in a plurality of subframes, it may be able to appropriately perform indexing on (E)CCE. More specifically, a legacy search space configuration has a principle that a candidate of AL X consists of (E)CCE having contiguous indexes. If the principle is maintained, it may be able to configure a processing operation of a UE in (E)CCE domain to be identical or similar to a legacy (E)PDCCH reception situation. By doing so, implementation of a UE can be simplified. To this end, when there is a series of subframes capable of performing repetitive transmission, the present invention proposes a method of performing indexing on the (E)CCE while skipping a subframe.

FIG. 13 is a diagram for an example of repeatedly transmitting control information in a plurality of subframes according to one embodiment of the present invention. Referring to FIG. 13, 4 (E)CCEs are formed in a subframe and 8 adjacent subframes are used for defining a search space via repetitive transmission. In this case, (E)CCE is configured while one subframe is skipped.

Referring to FIG. 13, first of all, (E)CCE #0 is set (indexed) to a subframe #0, a subframe #1 is skipped, and (E)CCE #1 is set to a subframe #2. By doing so, (E)CCE #3 is set to a subframe #6. Then, (E)CCE #4 is set to the subframe #1, the subframe #2 is skipped, and (E)CCE #5 is set to a subframe #3. By doing so, (E)CCE #7 set to a subframe #7. Then, it may be able to repeat the same operation from (E)CCE #8 by return to the subframe #0. If the indexing is performed on the (E)CCEs and a candidate is formed using contiguous (E)CCEs, it may be able to generate an effective candidate in repetitive transmission as well.

For example, while each of a candidate of AL 4 starting from the (E)CCE #0 and a candidate of AL 4 starting from the (E)CCE #4 uses contiguous (E)CCEs, the candidates are repeatedly transmitted in every 4 subframes in a manner of being mixed. By doing so, it may be able to obtain time diversity. And, since a candidate of AL 8 is repeatedly transmitted in every 8 subframes, the candidate and a different AL candidate may coexist.

FIG. 14 is a diagram for a different example of repeatedly transmitting control information in a plurality of subframes according to one embodiment of the present invention. In this case, a relative position of a subframe in a repetition period is changed to a binary number and bit reversal is performed to turn over the directions of a most significant bit and a least significant bit. Then, (E)CCE is deployed to each subframe according to an order of a result of the bit reversal. For example, when 8 subframes exist at a repetition period, an order of deploying (E)CCE of each subframe is as follows.

Subframe #0=>000=>000=>0
Subframe #1=>001=>100=>4
Subframe #2=>010=>010=>2
Subframe #3=>011=>110=>6
Subframe #4=>100=>001=>1
Subframe #5=>101=>101=>5
Subframe #6=>110=>011=>3
Subframe #7=>111=>111=>7

In particular, (E)CCE can be deployed one by one in an order of subframe #0->#4->#2->#6->#1->#5->#3->#7. As a result, if a candidate of AL X consists of X number of (E)CCEs having contiguous indexes starting from (E)CCE #n that satisfies n mode X=0, it may be able to configure a candidate for spanning the whole repetition period as much as possible. If the X corresponds to 4, it may configure a candidate using ECCEs ranging from (E)CCE #0 to ECCE #3. In this case, the ECCEs can be sequentially transmitted in an order of subframe #0->#4->#2->#6.

Of course, an order of aggregating (E)CCEs constructing a candidate can be performed according to the aforementioned proposed method in a situation different from the (E)CCE indexing itself. For example, in case of applying the principle mentioned earlier in FIG. 14, subframes are ordered in a manner of performing bit reversal on relative positions of the subframes irrespective of (E)CCE indexing and it may be then able to configure a candidate by bringing (E)CCE. For example, the subframe #0->#4->#2->#6->#1->#5->#3->#7 can be ordered like #0->#1->#2->#3->#4->#5->#6->#7. In case of configuring a candidate using 4 contiguous ECCEs, if the candidate is configured using ECCEs included in subframes #0, #1, #2 and #3, the subframes #0, #1, #2 and #3 may correspond to the subframes #0, #4, #2, and #6 before the ordering is performed.

Consequently, this type reorders an order of subframes used in repetitive transmission. The type can also be applied to a general channel including PDSCH. For example, when a specific PDSCH is repeated in Y number of subframes in a repetition period consisting of X number of subframes, it may perform bit reversal on a subframe order by applying the principle mentioned earlier in FIG. 14 and may be then able to configure the PDSCH to be repeated in the Y number of subframes on the contiguous indexes.

As mentioned in the foregoing description, an operation of mixing a plurality of patterns in which the same message is repeatedly transmitted to a plurality of subframes in time domain can be performed. In this case, a candidate of a lower AL can be implemented in a form of selecting a partial subframe only. As a result, the number of repetition can be differentiated according to a candidate. In this case, SF or ECCE indexing can be performed using the aforementioned scheme. For example, the SF indexing or the ECCE indexing can be configured to select an even-numbered subframe first and select an odd-numbered subframe later.

Figure 15:
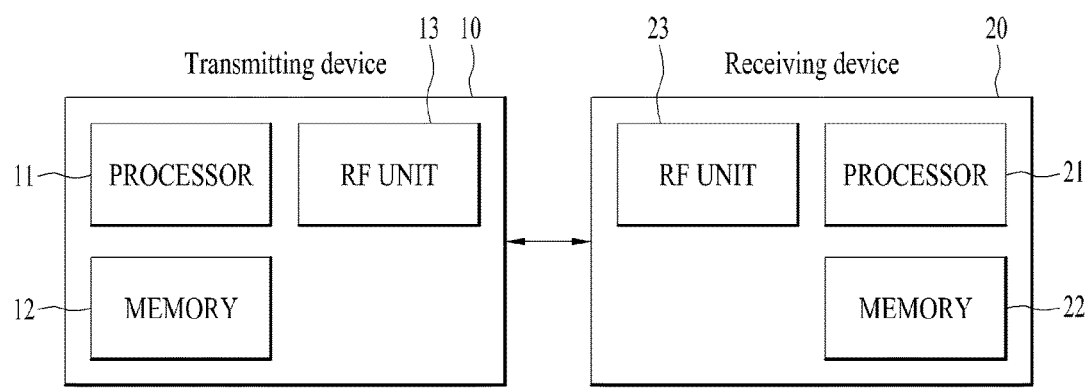
FIG. 15 is a block diagram illustrating elements of a transmitting device 10 and a receiving device 20 for implementing the present invention.

FIG. 15 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

A processor of an eNB transmits a first message to a UE based on a common configuration according to one embodiment of the present invention and can include a UE-specific configuration in the first message. And, the processor of the eNB can transmit a second message to the UE according to the UE-specific configuration.

A processor of a UE receives a first message based on a common configuration according to one embodiment of the present invention. If a UE-specific configuration is included in the first message, the processor of the UE can receive a second message according to the UE-specific configuration. In particular, the transmitted/received UE-specific configuration and/or the common configuration can be applied to the aforementioned embodiments of the present invention. It is apparent that the present invention is applicable not only to the aforementioned embodiments but also to various situations.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

What is claimed is:

1. A method of receiving a signal, by a user equipment (UE) based on a UE-specific configuration in a low-cost machine type wireless communication system, the method comprising:
    receiving a common configuration including information on the number of repeated transmissions for a plurality of UEs through a broadcasting channel transmitted from a base station;
    receiving a first message containing the UE-specific configuration including information on the number of repeated transmissions for the UE based on the common configuration; and
    receiving, from a base station, a second message based on the UE-specific configuration,
    wherein the UE informs the base station of the necessity to update the received UE-specific configuration status using a RACH preamble of a random access procedure when a channel status is changed after receiving the second message,
    wherein the UE receives an updated UE-specific configuration through a message related to the random access procedure.

2. The method of claim 1, wherein the common configuration comprises:
    information on a rate matching pattern of the first message.

3. The method of claim 1, wherein the common configuration is configured by at least one of an identifier of the UE and a pre-configuration.

4. The method of claim 1, wherein the common configuration is set for the UE in advance.

5. The method of claim 1, wherein the common configuration is received via system information blocks (SIB) for the low-cost machine type.

6. The method of claim 5, wherein the SIB for the low-cost machine type and a physical downlink shared channel of a subframe are transmitted in a time domain.

7. The method of claim 5, wherein the second message corresponds to at least one selected from a group consisting of a message transmitted on a physical downlink shared channel, a message transmitted on a physical downlink control channel, and a message transmitted on an enhanced physical downlink control channel.

8. The method of claim 1, further comprising:
    receiving uplink scheduling information from an eNB via a control channel; and
    transmitting a third message to the eNB based on the uplink scheduling information,
    wherein when the uplink scheduling information is performed based on the common configuration, the third message is transmitted using the common configuration, and
    wherein when the uplink scheduling information is performed based on the UE-specific configuration, the third message is transmitted using the UE-specific configuration.

9. The method of claim 1, further comprising:
receiving uplink scheduling information from an eNB via a control channel; and
transmitting a third message to the eNB based on the uplink scheduling information,
wherein the third message is determined based on an attribute of the control channel.

10. A user equipment (UE) in a wireless communication system supporting a machine type communication, the UE comprising:
a transceiver; and
a processor, operatively coupled to the transceiver, wherein the processor is configured to:
control the transceiver to receive a common configuration including information on the number of repeated transmissions for a plurality of UEs through a broadcasting channel transmitted from a base station;
control the transceiver to receive a first message containing the UE-specific configuration including information on the number of repeated transmissions for the UE based on the common configuration; and
control the transceiver to receive a second message based on the UE-specific configuration from a base station,
wherein the UE informs the base station of the necessity to update the received UE-specific configuration status using a RACH preamble of a random access procedure when a channel status is changed after receiving the second message, and
wherein the UE receives an updated UE-specific configuration through a message related to the random access procedure.

* * * * *